United States Patent [19]

Kawada et al.

[11] Patent Number: 5,403,988
[45] Date of Patent: Apr. 4, 1995

[54] STUD WELDING APPARATUS

[75] Inventors: Masaki Kawada; Takashi Shimada; Hideo Nakamura; Toshio Emori; Yoshihiro Egawa; Tomohiko Yashiro; Hiroyuki Enomoto; Hisao Hiramoto; Masayuki Fukumori; Kiyoshi Tsukada; Koichi Maekawa, all of Sayama, Japan

[73] Assignee: Honda Giken Kogyo Kabushiki Kaisha, Tokyo, Japan

[21] Appl. No.: 253,921

[22] Filed: Jun. 3, 1994

[30] Foreign Application Priority Data

| Jun. 7, 1993 | [JP] | Japan | 5-030356 U |
| Jun. 7, 1993 | [JP] | Japan | 5-136141 |
| Jun. 7, 1993 | [JP] | Japan | 5-136142 |
| Jun. 7, 1993 | [JP] | Japan | 5-136144 |
| Jun. 7, 1993 | [JP] | Japan | 5-136191 |
| Oct. 4, 1993 | [JP] | Japan | 5-247997 |
| Oct. 25, 1993 | [JP] | Japan | 5-266246 |

[51] Int. Cl.$^6$ ............................................. B23K 9/20
[52] U.S. Cl. ....................................................... 219/98
[58] Field of Search ..................................... 219/98, 99

[56] References Cited

FOREIGN PATENT DOCUMENTS 60-227979 11/1985 Japan .
62-109884 7/1987 Japan .
2-15882 1/1990 Japan .

Primary Examiner—Clifford C. Shaw
Attorney, Agent, or Firm—Armstrong, Westerman, Hattori, McLeland & Naughton

[57] ABSTRACT

A stud welding apparatus has a welding jig, guide frames and a cartesian coordinate type robot. This robot has a travelling frame, a robot main body, an elevating arm and a stud welding gun. Power supply passages are provided on the travelling frame, the robot main body and the elevating arm, respectively, such that electric power can be supplied from a welding power source to the stud welding gun via these power supply passages. The power supply passage provided on the travelling frame is formed in a first power supply bar which is fixed to the travelling frame and is elongated in a horizontal direction. A pressure type first power supply joint is provided on the robot main body and urges a contact member to be connected to the power supply passage provided on the robot main body into contact and away from the first power supply bar by means of a cylinder. The power supply passage provided on the elevating arm is formed in a second power supply bar which is fixed to the elevating arm and is elongated in a vertical direction. A pressure type second power supply joint is provided on the robot main body and urges a contact member to be connected to the power supply passage provided on the robot main body into contact and away from the second power supply bar by means of a cylinder.

16 Claims, 18 Drawing Sheets

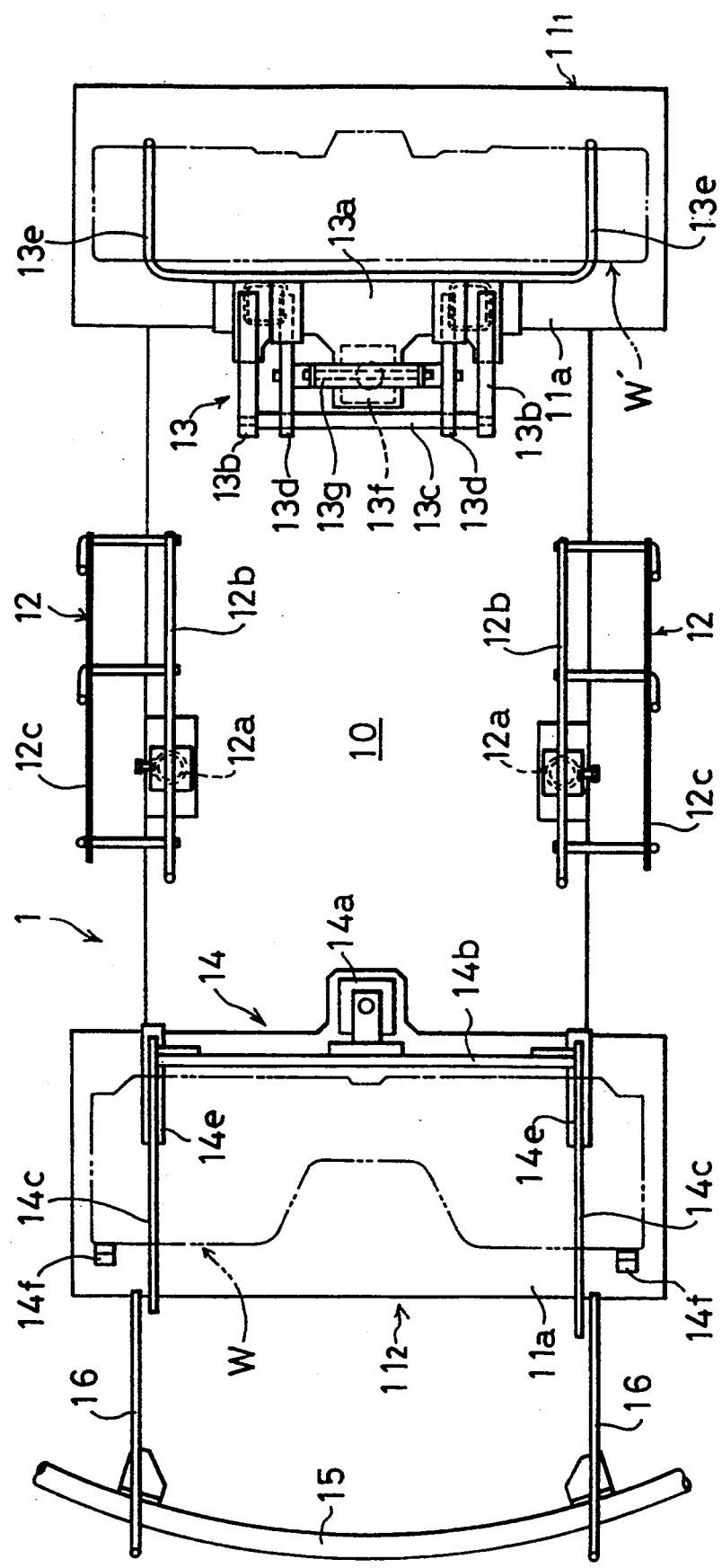

STUD WELDING APPARATUS

BACKGROUND OF THE INVENTION

1. Field of the Invention

The present invention relates to a stud welding apparatus for carrying out automatic welding by using a stud welding gun.

2. Description of Related Art

As this kind of stud welding apparatus, there is conventionally known the following apparatus (see Japanese Published Unexamined Utility Model Registration Application No. 109884/1987). Namely, above a position of disposing a welding jig on which a workpiece can be set, there are disposed a pair of guide frames which longitudinally extend in an X-axis direction at a distance therebetween in a Y-axis direction, where the X-axis and the Y-axis are lines extending in two horizontal directions. There is provided a cartesian coordinate type robot which is made up of a travelling frame which is supported so as to bridge the guide frames and is movable in the X-axis direction, a robot main body which is supported on the travelling frame and is movable in the Y-axis direction, and a vertically elongated elevating arm which is supported on the robot main body and is movable up and down. A stud welding gun is mounted on a wrist portion at a lower end of the elevating arm so that a plurality of welding spots of the workpiece on the welding jig can be automatically welded.

In this conventional stud welding apparatus, there is provided between the travelling frame and the elevating arm an articulated type power supply link which moves to follow the elevating arm so that the electric power can be supplied from a welding power source to the stud welding gun via the power supply link and a power supply passage provided on the elevating arm. In each of the articulated portions of the power supply link there is provided a slip power supply joint which has that contact to be urged by a spring which electrically connects two link members that are to be connected at each of the articulated portions.

Further, in the above-described stud welding apparatus, the wrist portion at the lower end of the elevating arm is made in a double-axis construction provided with a wrist main body which is supported at the lower end of the elevating arm so as to be rotatable about a vertical axis, and a tool holder which is supported on the wrist main body so as to be rotatable about a horizontal axis, and the stud welding gun is mounted on the tool holder. The power supply passage provided on the elevating arm is connected to a power supply passage provided on the wrist main body via a slip power supply joint which is provided on the axis of rotation of the wrist main body and has the same construction as the one described above. The power supply passage provided on the wrist main body is connected to a power supply passage provided on the tool holder via a slip power supply joint which is provided on the axis of rotation of the tool holder and has the same construction as the one described above, and the stud welding gun is thus supplied with the electric power via the power supply passages.

In the above-described stud welding apparatus, the robot main body and the elevating arm are driven by a rack and pinion mechanism. In such a construction, when the welding spots of the workpiece are pressed or forced by the stud welding gun, a pressure reaction force (i.e., a reaction force to be generated against pressing) operates or works on the elevating arm and the robot main body, with the result that a rack and a pinion in the rack and pinion mechanism are likely to be subjected to wear.

Further, in case the above-described slip power supply joint is used, the contact is caused to slidably contact the mating (or the opposite) member when the robot is operated, with the result that the contact and the mating member are subjected to wear. Therefore, the power supply joint must be frequently replaced and the ease with which the apparatus can be maintained becomes poor.

SUMMARY OF THE INVENTION

In view of the above-described points, the present invention has an object of providing a stud welding apparatus in which the pressure reaction force to be operated on the robot can be received by utilizing the power supply mechanism in order to prevent the wear on the driving system of the robot and, in addition, to decrease the frequency at which the power supply joint must be replaced, thereby improving the ease with which the apparatus can be maintained.

In order to attain the above and other objects, the present invention is a stud welding apparatus having a welding jig which has a plurality of back electrodes to abut a plurality of spots on a workpiece and on which the workpiece can be set, a pair of guide frames which are elongated in an X-axis direction and are set apart from each other in a Y-axis direction above a position in which the welding jig is disposed, the X-axis and the Y-axis being of two horizontal directions, a cartesian coordinate type robot comprising a travelling frame which is supported in a bridging manner on both the guide frames and is movable in the X-axis direction, a robot main body which is supported on the travelling frame and is movable in the Y-axis direction, and a vertically elongated elevating arm which is supported on the robot main body off towards one side in the X-axis direction relative to the travelling frame and is movable up and down, and a welding gun which is mounted on a wrist portion at a lower end of the elevating arm. This stud welding apparatus comprises power supply passages which are provided on the travelling frame, the robot main body and the elevating arm, respectively, such that electric power can be supplied from a welding power source to the stud welding gun via these power supply passages, the power supply passage provided on the travelling frame being constituted by a first power supply bar which is fixed to the travelling frame and is elongated in the Y-axis direction, a pressure type first power supply joint which is provided on the robot main body and urges a contact member to be connected to the power supply passage provided on the robot main body into, and out of, contact with the first power supply bar by means of a cylinder, the power supply passage provided on the elevating arm being constituted by a second power supply bar which is fixed to the elevating arm and is elongated in a vertical direction, and a pressure type second power supply joint which is provided on the robot main body and urges a contact member to be connected to the power supply passage provided on the robot main body into, and out of, contact with the second power supply bar by means of a cylinder.

When the welding spots of the workpiece are pressed by the stud welding gun, the contact members of the first power supply joint and of the second power supply joint are respectively strongly urged or pressed against the power supply bars. According to this arrangement, a pressure reaction force in the vertical direction to be operated on the elevating arm can be received by the friction force between the second power supply bar and the contact member of the second power supply joint. The pressure reaction force in the Y-axis direction to be operated on the robot main body can also be received by the friction force between the first power supply bar and the contact member of the first power supply joint. The pressure reaction forces to be operated on the driving system of the elevating arm and the driving system of the robot main body can thus be reduced, with the result that these driving systems are less likely to be subjected to wear.

When the robot main body and the elevating arm are moved, the contact members of the first and the second power supply joints are respectively moved out of contact with the first and the second power supply bars. Each of these contact members does not come into sliding contact with each of the power supply bars and, therefore, these contact members and the power supply bars become less likely to cause wear. The frequency at which the respective power supply joints and respective power supply bars must be replaced is reduced, resulting in an improvement in the ease with which the maintenance thereof can be carried out.

The following arrangement may also be employed. Namely, a power supply bar which is elongated in the X-axis direction and is connected to the welding power source is fixed to one of the guide frames, and a pressure type power supply joint which connects the first power supply bar to the power supply bar on one of the guide frames, is mounted on the travelling frame so that the pressure reaction force to be operated on the travelling frame in the X-axis direction can be received by the power supply joint. However, when the travelling frame is supported in a manner to bridge the guide frames on both sides in the Y-axis direction, it is normal practice to provide, symmetrically on both sides of the Y-axis direction, a rack and pinion mechanisms for driving the travelling frame. The pressure reaction force in the X-axis direction to operate on the travelling frame can therefore be duly received (or received without undue force) by the rack and pinion mechanisms on both sides of the Y-axis direction. It is thus not particularly necessary to receive the pressure reaction force in the X-axis direction by a pressure type power supply joint. It is therefore preferable to connect the first power supply bar to the welding power source via a cable to simplify the cabling arrangement and to reduce the cost therefor.

Since the elevating arm is supported on the robot main body off to one side in the X-axis direction relative to the travelling frame in order to prevent the interference thereof with the travelling frame, an angular moment about the Y-axis operates on the robot main body due to the weight of the elevating arm. Especially, when the stud welding gun is directed in one X-axis direction and the workpiece is pressed from the opposite side in the X-axis direction by the stud welding gun, there will operate on the robot main body, via the arm, an angular moment that is in the same direction as the above-described angular moment. An undue force is therefore applied to that portion of the robot main body which supports it on the travelling frame. In such a case, if an arrangement is made such that a direction of urging the contact member of the first power supply joint against the first power supply bar is set such that an angular moment that is opposite to an angular moment about the Y-axis which is operated on the robot main body due to the weight of the elevating arm, operates on the robot main body through a pressure reaction force of the contact member against the first power supply bar, even if the workpiece is pressed from the opposite side in the X-axis direction, the angular moment to be operated on the robot main body due to the pressure reaction force is canceled by the angular moment in the opposite direction that is caused by the pressure reaction force of the contact member of the first power supply joint against the first power supply bar. Therefore, there will occur no undue force on that supporting portion of the robot main body.

When the wrist portion comprises a wrist main body which is supported on a lower end of the elevating arm so as to be rotatable about a vertical axis, and a tool holder which is supported in the wrist main body so as to be rotatable about a horizontal axis and the stud welding gun is mounted on a tool holder, and electric power is supplied from the second power supply bar to the stud welding gun via the power supply passage provided on the wrist main body and the power supply passage provided on the tool holder, it can also be considered, like in the above-described conventional apparatus, to provide a slip power supply joint respectively on an axis of rotation of the wrist main body and on an axis of rotation of the tool holder. This will, however, give rise to disadvantages in that the power supply joints are subjected to wear and that rotation loads on the wrist main body and on the tool holder increase. On the contrary, if there are provided a pressure type third power supply joint which is provided around the wrist main body and urges a contact member to be connected to the second power supply bar into, and out of, contact with the power supply passage provided on the wrist main body by means of a cylinder, and a pressure type fourth power supply joint which is provided on an axis of rotation of the tool holder and urges a contact member to be connected to one of the power supply passage provided on the wrist main body and the power supply passage provided on the tool holder into, and out of, contact with the other of the power supply passages by means of a cylinder, the contact members of the third and the fourth power supply joints can be moved out of contact with the mating members at the time of rotating the wrist main body and the tool holder. The above-described disadvantages will therefore not occur.

Furthermore, by disposing the third power supply joint on the periphery of the wrist main body, a driving shaft for the tool holder can be provided by inserting it on the axial line of rotation of the wrist main body. The driving system of the tool holder can therefore be disposed with a good space efficiency.

In case the third power supply joint is provided around the wrist main body as described above, for preventing the wrist main body from being applied with an unbalanced load, it is preferable to provide an electrically conducting ring which is fitted on an outer periphery of the wrist main body and constitutes the power supply passage provided on the wrist main body, to provide the contact member of the third power supply joint in a pair such that they strongly contact the electrically conducting ring from diametrically opposite directions, and to mount a cylinder of the third power supply joint in a pair on the elevating arm in diametrically opposite positions of the electrically conductive ring such that each of the contact members is connected to a piston rod of each of the cylinders. Further, for equalizing the wiring length between the contact members and the second power supply bar, it is also preferable to provide a pair of tap members to be connected to the second power supply bar in the elevating arm in diametrically opposite positions that are at right angles to the diametrical positions of the electrically conductive ring, and to connect both end portions of each of the contact members to the tap members via a pair of flexible electrically conductive members.

In this case, if the flexible electrically conductive members are disposed in a compact manner without bending them into a U-shape, the connecting end of the flexible electrically conductive members to the contact members is likely to cause an arcuate movement with the tap member functioning as a center of the movement. As a result, when the contact members are moved into, and out of, contact with the electrically conductive ring, an unbalance load in a tangential direction of the electrically conductive ring will operate on the contact members. If each of the contact members is connected to each of the tap members by a single piece of flexible electrically conductive member, a gouging will occur in the cylinder due to the unbalanced load in the tangential direction. On the other hand, if each of the contact members is connected to both the tap members respectively via a pair of flexible electrically conductive members, as described above, the unbalanced load in one tangential direction to be operated by one of the flexible electrically conductive members is canceled by the unbalanced load in the opposite tangential direction by the other of the flexible electrically conductive members. Therefore, the contact members can advantageously be moved into, and out of, contact smoothly without the occurrence of gouging in the cylinders.

In case the fourth power supply joint is provided on the axial line of the tool holder as described above, the following arrangement may also be considered. Namely, on one of the wrist main body and the tool holder the cylinder is mounted on the axial line of rotation of the tool holder. The contact member which is connected to the power supply passage provided on one of the members is connected to the piston rod of the cylinder. The contact member is thus made to move into, and out of, contact with the power supply passage provided on the other of the members through the operation of the cylinder. In this arrangement, however, at the time of pressing the contact member, the pressing force operates between the wrist main body and the tool holder, sometimes giving a bad effect on the wrist main body and the tool holder. On the other hand, if an arrangement is made such that a cylinder of the fourth power supply joint is mounted on one of the wrist main body and the tool holder in a position on an axis of rotation of the tool holder, that an electrically conductive annular plate which constitutes a power supply passage to be provided on said one of the wrist main body and the tool holder is fixed to a front cover of the cylinder, that the contact member of the fourth power supply joint to be connected to a power supply passage provided in the other of the wrist main body and the tool holder is disposed opposite in the direction of axis of rotation relative to the electrically conductive annular plate, and that the contact member is rotatably connected to that piston rod of the cylinder which projects out of the front cover, when the cylinder is operated to contract to bring the contact member into strong contact with the annular electrically conductive plate, the pressing force of the cylinder is received by the front cover of the cylinder via the contact member and the annular electrically conductive plate and, consequently, the pressing force will not operate on a member other than the fourth power supply joint, and there will occur no such disadvantage as described above. In this case, if the contact member is directly connected to the piston rod of the cylinder, when the tool holder is rotated, the piston rod will be rotated relative to the cylinder due to the relative rotation of the contact member with respect to the annular electrically conductive plate, resulting in a wear of sealing members for the piston rod and the piston. However, if the contact member is rotatably connected to the piston rod as described above, this kind of disadvantage will not occur.

Further, if the contact members for the first through the fourth power supply joints are connected to the piston rod of each of the cylinders of the power supply joints in an oscillating manner (i.e., so as to be tiltable in any direction), each of the contact members will positively be brought into contact with the power supply bar, the electrically conductive ring or the annular electrically conductive plate to follow it. It is therefore advantageous in that the power supply loss can be avoided.

The travelling frame is subjected to an angular moment about the Y-axis due to the weight of the elevating arm that is supported on the robot main body off to one side in the in one X-axis direction relative to the travelling frame. In order to enable for the travelling frame to move in the X-axis direction in a stable posture, it is preferable to arrange such that the stud welding apparatus further comprises a bracket which extends in one X-axis direction and is fixed on each end of the travelling frame, a first linear guide which is disposed on the bracket closer to the travelling frame, a second liner guide which is disposed on the bracket off the first linear guide in one X-axis direction, and a guide rail on each of the guide frames so as to slidably support the travelling frame via the linear guides so that the above-described angular moment can be received by the second linear guide. Further, in case the travelling frame is self-propelled in the X-axis direction by disposing pinions which engage with racks fixed to the guide frames and an electric motor for driving the pinions, there will occur the following phenomenon. Namely, when the workpiece is pressed by the stud welding gun from the opposite side in the X-axis direction, the angular moment about the Y-axis due to the pressure reaction force and the angular moment due to the weight of the elevating arm will operate in the same direction. Therefore, the travelling frame will tilt with the first linear guide functioning as a fulcrum, with the result that the portion thereof on the second linear guide side will sink. If the pinions are disposed on the side of the second linear guide, the pinions will move downwards relative to the racks and will give rise to the gouging between the pinions and the racks. On the contrary, if the pinions are disposed in substantially the same position in the X-axis direction as the first linear guide, the pinions will not move up and down and the wear due to gouging between the pinions and the racks can advantageously be prevented.

If the travelling frame is constituted by a pair of beam members which are parallelly provided at a distance in the vertical direction so as to support the robot main body on both the beam members, and a first driving source for driving the travelling frame and a second driving source for driving the robot main body or the elevating arm are disposed between both the beam members, the bending rigidity and the torsional rigidity of the travelling frame become high, and the robot main body can be supported by both the beam members while leaving a vertical span therebetween. Therefore, the supporting rigidity of the robot main body against the angular moments about the Y-axis and the X-axis can be increased. Further, by using the distance between both the beam members as the space for disposing the first and the second driving sources, the space can be effectively utilized.

The stud welding gun comprises a pressing cylinder and an electrode which is mounted, via an electrode holder, on a piston rod which projects beyond a front cover of the pressing cylinder. The workpiece is thus pressurized by abutting the electrode against the workpiece by the operation of the pressing cylinder. There are however cases where, depending on the place of welding spots on the workpiece, the electrode must be slantingly abutted against the surface of the workpiece. At this time, a bending load or a rotating force due to the pressure reaction force operates on the piston rod, with the result that gauging or scratching sometimes occurs between the piston rod or the piston and the cylinder, or an undue force is applied to the power supply member for the electrode. In this case, if the piston rod is arranged to be eccentric to the piston inside the pressing cylinder, and the welding gun further comprises a guide rod which is smaller in diameter than the piston rod and extends rearwards of the piston through a rear cover on the rear end of the piston, and a boss portion which is provided inside the rear cover so as to be fitted on an outside of the guide rod, the piston rod is prevented from rotating. Further, since the piston rod is supported by the front cover and, via the guide rod, by the rear cover, the supporting rigidity of the piston rod against the bending load is increased and the above-described disadvantages do not occur. In order to secure a pressure receiving area of the piston at the time of pressing the electrode, the guide rod is made smaller in diameter than the piston rod as described above. But, by means of the boss portion which are provided inside the rear cover, the inserting length of the guide rod can be made large, thereby securing a sufficient supporting rigidity of the piston rod.

In the welding jig there are provided a plurality of back electrodes to abut a plurality of welding spots on the workpiece. Welding is carried out in a condition in which the workpiece is held in a strongly pressed manner between the stud welding gun and each of the back electrodes. Conventionally, all the back electrodes are connected to the welding power source via a common electric power supply route. As a result, when welding is carried out by pressingly holding the workpiece between the stud welding gun and any one of the back electrodes, there occurs a shunt current phenomenon in which the welding electric current flows also to other back electrodes that are present near the back electrode in question. As a solution, it is normal practice to weld by setting the welding electric current to a value which has added thereto in advance the amount corresponding to the shunt current. This solution has, however, a disadvantage in that the electric current to be supplied to the stud welding gun becomes so high that a high wear on the electrode of the stud welding gun occurs. Further, since the amount of shunt current varies with the accuracy of the workpiece, the welding quality is likely to fluctuate. In this case, if the plurality of back electrodes of the welding jig are classed into a plurality of groups so as to prevent back electrodes lying close to each other from belonging to the same group as much as possible, and power supply route is provided in a plurality of numbers depending on the grouping of the back electrodes, and means is provided for selectively connecting the power supply routes to the welding power supply source, there are the following advantages. Namely, when one of the power supply route is connected to the welding power source to carry out welding on the welding spots coinciding with the back electrodes that belong to the group corresponding to this power supply route, the back electrodes that are close to the back electrodes in question are not connected to the welding power source and, consequently, the occurrence of shunt current can be restrained. Therefore, the welding electric current can be set to a relatively small value to thereby reduce the wear on the electrode of the stud welding gun.

By the way, depending on the layout of the back electrodes, back electrodes that lie close to each other are sometimes inevitably classed into the same group. In such a case, it is preferable to provide means for detecting an electric current to flow in each of the back electrodes and means for controlling a welding electric current depending on a detected value of the electric current to thereby control the electric current to flow to the welding spots under welding to a predetermined welding electric current.

When a first welding step for assembling a semi-product by assembling a plurality of workpieces and a second welding step for assembling a product by welding other workpieces to the semi-product are performed, the first welding step and the second welding step are conventionally performed by separate welding apparatuses. Since the equipment costs then become high, it is preferable to enable to perform the first welding step and the second welding step by a single welding apparatus.

In this case, the following arrangement may be considered. Namely, a first welding jig for the first welding step and a second welding jig for the second welding step are mounted on a turn table, and the first welding jig and the second welding jig are arranged to be alternately reversible between the welding position within the range of movement of the cartesian coordinate type robot and the setting position outside the range of the above-described movement. When the first welding jig is returned to the setting position via the welding position, the semi-product that was assembled through the carrying out of the first welding step is taken out and the workpieces for the next semi-product are set to the first welding jig. When the second welding jig is returned to the setting jig via the welding position, the product that was assembled through the carrying out of the second welding step at the welding position is taken out and the semi-product that was earlier taken out of the first welding Jig and other workpieces are set to the second welding jig. According to this operation, the first welding step and the second welding step can be alternately carried out in the same welding apparatus.

However, in this arrangement, it is necessary to secure a place for placing the semi-product, aside from the place for placing a plurality of workpieces for the semi-products and the place for placing the workpieces to be subsequently welded to the semi-product. A large space is therefore required and there is likely to occur a wrong work in which the workpieces for the semi-products, in place of the semi-products themselves, are wrongly set to the second welding jig.

On the other hand, if the stud welding apparatus further comprises a tentative supporting member which is provided on the turn table for tentatively supporting a semi-product and is positioned in an intermediate position between both the welding jigs, and transfer means which is provided on the turn table for transferring a semi-product on the first welding jig to the tentative supporting member and is positioned on the side of the first welding jig, the following becomes possible. Namely, after the first welding jig has been reversed to the welding position and the first welding step has been performed, the semi-product on the first welding jig can be transferred to the tentative supporting member and then an operator can set this semi-product to the second welding jig that is in the setting position. Therefore, it is not necessary to secure in the setting position the place for placing the semi-product. As a result, while the space can be reduced, the semi-product is placed on the tentative supporting member on the turn table that is spaced apart from the place for placing the workpieces in the setting position. Therefore, the wrong work of wrongly setting the workpieces for the semi-products, in place of the semi-products themselves, to the second welding jig can be prevented.

When the second welding jig is returned to the setting position, it is necessary to discharge the product and also to set semi-products and still other workpieces to the second welding jig, resulting in a heavy load on the operator. In this case, if means for discharging the product on the second welding jig is provided on the turn table on the side of the second welding jig, the heavy load on the operator can be reduced by automating the discharging of the products.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 18 is a plan view of the jig unit thereof; and

FIGS. 19A and FIG. 19B are views of a product assembled by the apparatus shown in FIG. 16, wherein FIG. 19A is a plan view thereof and FIG. 19B is a sectional view taken along the line XIX—XIX of FIG. 19A.

DETAILED DESCRIPTION OF PREFERRED EMBODIMENTS

Figure 1:
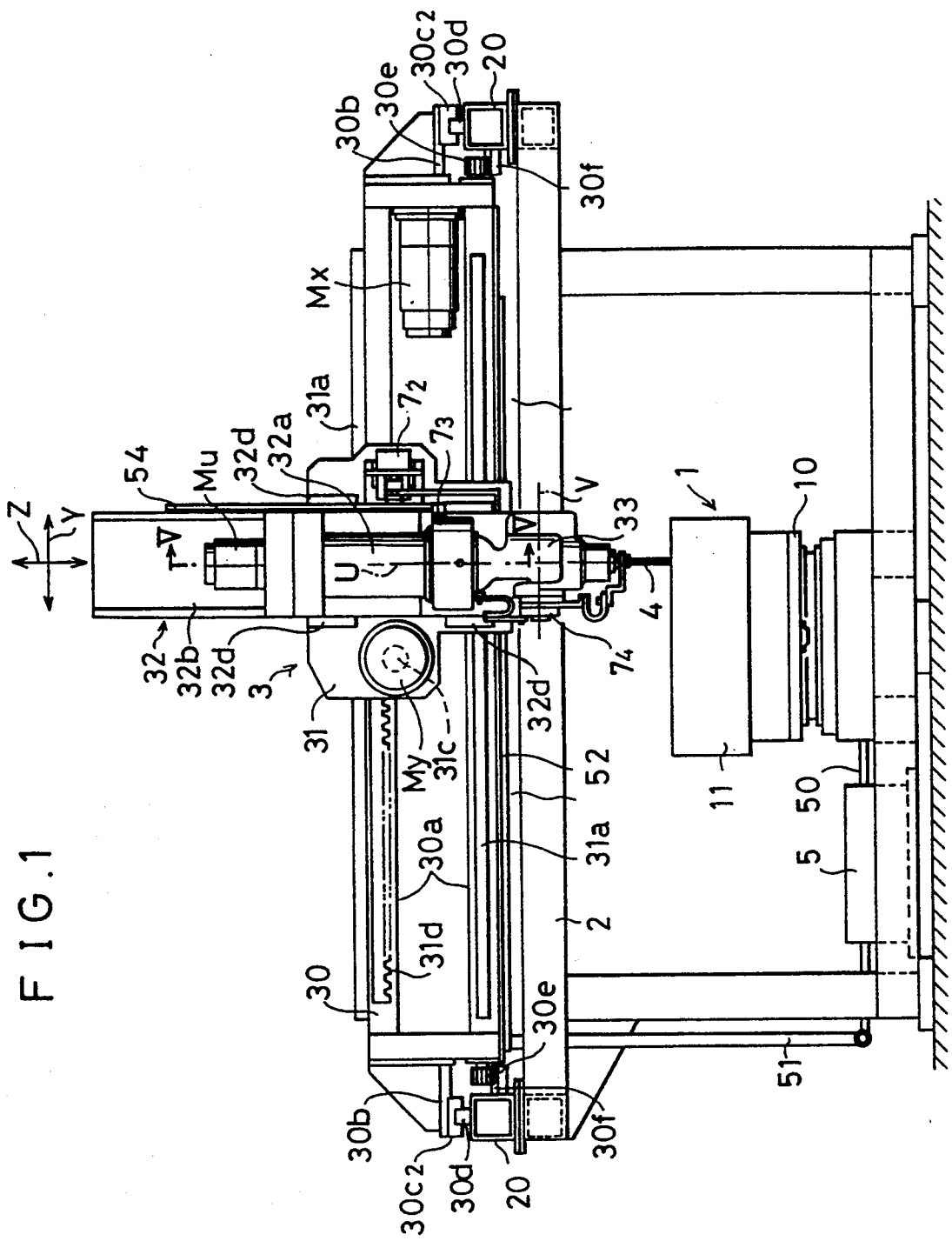
FIG. 1 is a front view of one example of the present invention apparatus.
Figure 2:
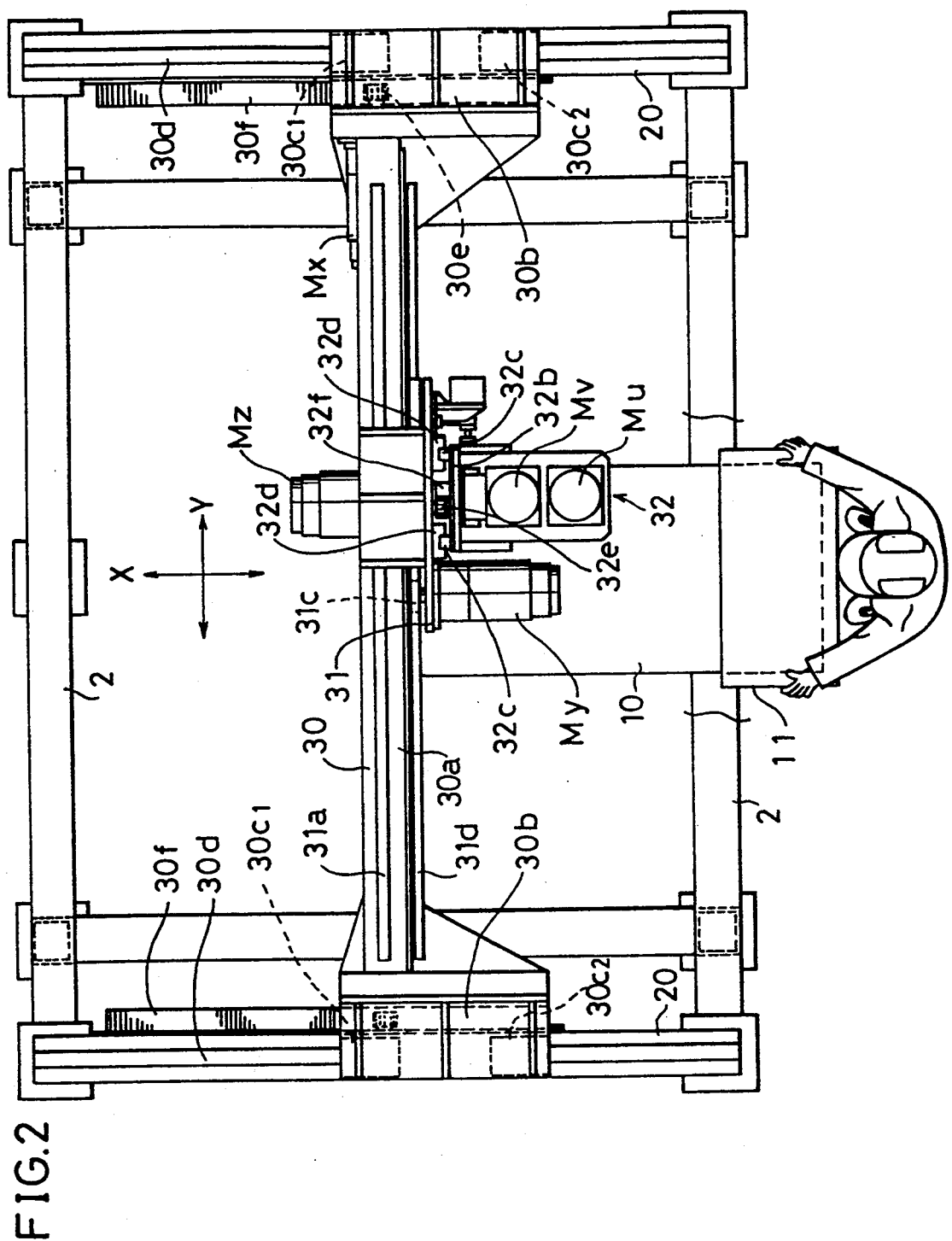
FIG. 2 is a plan view thereof.
Figure 3:
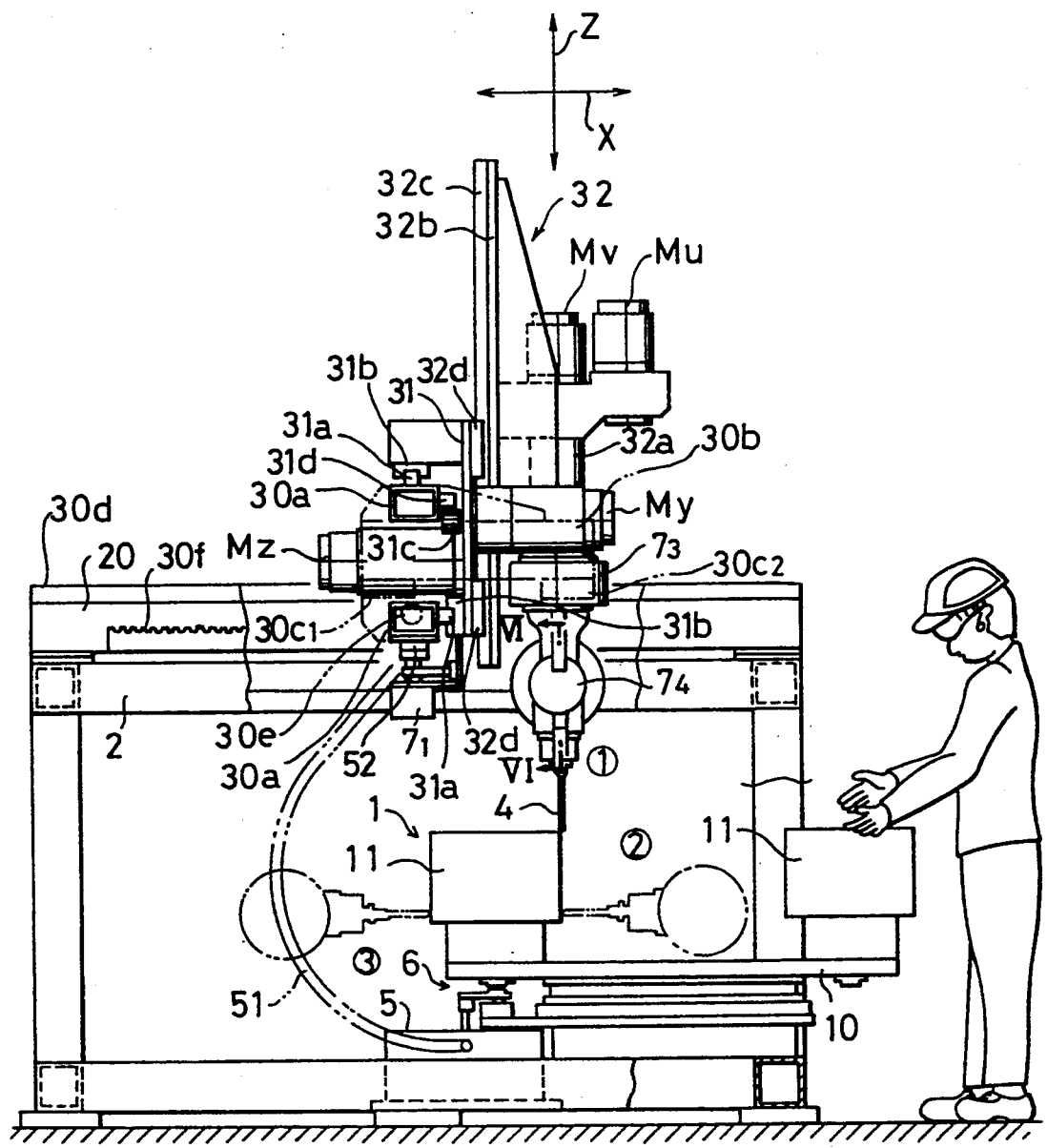
FIG. 3 is a side view thereof.

Referring to FIGS. 1 through 3, numeral 1 denotes a jig unit for setting thereon a workpiece and numeral 2 denotes a ceiling frame which is disposed to extend above a position in which the jig unit 2 is positioned. On this ceiling frame 2 there is mounted a cartesian coordinate type robot 3, and a stud welding gun 4 is attached to this robot 3 to thereby carry out stud welding of the workpiece is carried out.

The jig unit 1 is made up of a pair of welding jigs 11, 11 which are mounted on a turn table 10. The welding jigs 11, 11 are arranged to be alternately rotatable by the rotation of 180° of the turn table 10 between a welding position within a range of movement of the robot 3 and a setting position outside the range of movement of the robot 3.

The robot 3 is made up of: a travelling frame 30 which is provided to bridge guide frames 20, 20 which are fixed to beam members on both sides in a Y-axis direction of the ceiling frame 2, so as to be movable in an X-axis direction, where the X-axis is taken to extend in the depth direction of the ceiling frame 2, the Y-axis in the width direction thereof and a Z-axis in the vertical direction thereof; a robot main body 31 which is supported on the travelling frame 30 in a manner movable in the Y-axis direction; and an elevating arm 32 which is elongated in the Z-axis direction and is supported on the robot main body 31 away (or off) forwards in the X-axis direction relative to the travelling frame 30. At the lower end of the elevating arm 32 there is mounted the stud welding gun 4 via a wrist portion 33 which has a freedom of 2-axis movement about a vertical U-axis and a horizontal V-axis. It is thus so arranged that stud welding of the workpiece on the welding jig 11 that is in the welding position can be carried out from any direction by the change in posture of the stud welding gun 4 through the movement of the wrist portion 33.

The travelling frame 30 is made up of a rectangular frame body having, elongated in the Y-axis direction, a pair of beam members 30a, 30a made of square pipes which are disposed at a vertical distance therebetween. At each end of the travelling frame 30, there is fixed a bracket 30b which extends forwards in the X-axis direction, i.e., in the direction in which the elevating arm 32 is disposed away. On this bracket 30b there are provided a first linear guide $30c_1$ which lies closer to the travelling frame 30 and a second linear guide $30c_2$ which is away therefrom forwards in the X-axis direction. The travelling frame 30 is slidably supported via the linear guides $30c_1$, $30c_2$ on guide rails $30d$ which are fixed on the upper surface of the guide frame 20. An angular moment in the clockwise direction as seen in FIG. 3 that operates on the travelling frame 30 by the weights of the robot main body 31 and of the elevating arm 32 is thus received by the second linear guide $30c_1$ to prevent the tilting, by this angular moment, of the travelling frame 30 with the first linear guide $30c_1$ functioning as a fulcrum. The travelling frame 30 is made in this manner to be slidable in the X-axis direction in a stable posture.

Figure 4:
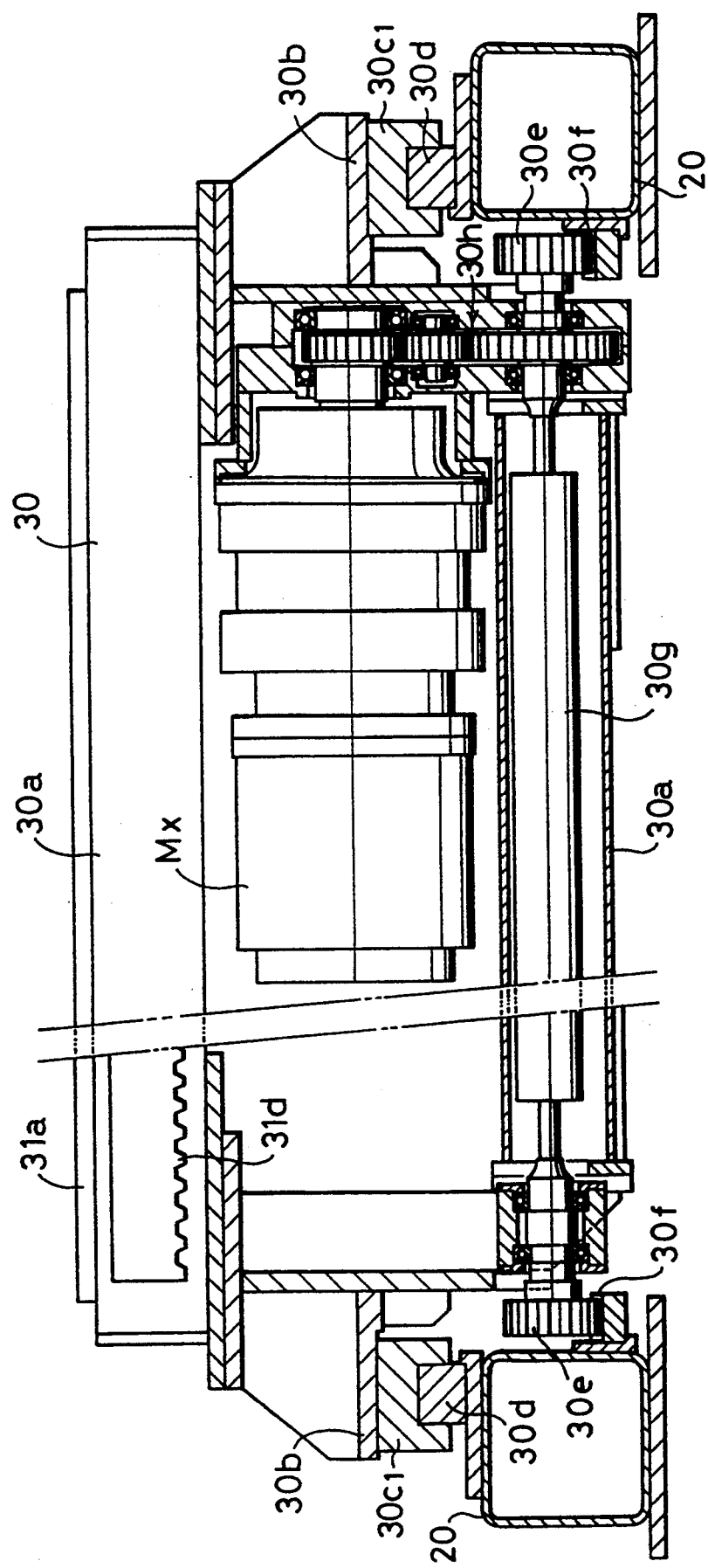
FIG. 4 is an enlarged front view, partly shown in section, of a travelling frame.

On the travelling frame 30 there are further provided an X-axis electric motor Mx (i.e., an electric motor for driving in the X-axis direction) and a pinion $30e$ which is connected thereto. The pinion $30e$ is engaged with a rack $30f$ which is provided on an inner side surface of the guide frame 20 so as to drive the travelling frame 30 in the X-axis direction. Here, the pinion $30e$ is disposed in substantially the same position in the X-axis direction as the first linear guide $30c_1$. In more detail, in this embodying example, the first linear guide $30c_1$ is disposed in substantially the same position in the X-axis direction as the upper and the lower beam members $30a$, $30a$ which constitute the travelling frame 30. A pinion shaft $30g$ is disposed to penetrate through the lower beam member $30a$ as shown in FIG. 4, and on each end of the pinion shaft $30g$ there is provided the pinion $30e$ which engages with the rack $30f$ on the respective guide frames 20. On one end of the travelling frame 30 there is mounted, in a position between the upper and the lower beam members $30a$, $30a$, the X-axis electric motor Mx. This electric motor Mx is connected via a gear train $30h$ to the pinion shaft $30g$ so as to drive the pinions $30e$ on both ends thereof.

When stud welding is carried out with the stud welding gun 4 pointing downwards as indicated by the encircled numeral (1) or rearwards in the X-axis direction as indicated by the encircled numeral (2) in FIG. 3 to carry out the welding of the workpiece from an upper side or from a forward side in the X-axis direction, respectively, a counterclockwise angular moment will operate on the travelling frame 30 due to the pressure reaction force. This angular moment, however, is canceled by a clockwise moment due to the weights of the robot main body 31 and the elevating arm 32 and, therefore, the travelling frame 30 will not tilt.

On the other hand, when stud welding is carried out from the rear side in the X-axis direction with the stud welding gun 4 pointing forwards in the X-axis direction as indicated by the encircled numeral (3) in FIG. 3, a clockwise angular moment will operate on the travelling frame 30 due to the pressure reaction force. Under a combined influence of the clockwise angular moment due to the weights of the robot main body 31 and of the elevating arm 32, the travelling frame 30 will tilt in the clockwise direction with the first linear guide $30c_1$ functioning as a fulcrum. If the pinions $30e$ are provided towards the side of the second linear guide $30c_2$, the pinions $30e$ will move downwards relative to the racks $30f$ and gouging will therefore occur between the pinions $30e$ and the racks $30f$. In the present embodying example, however, since the pinions $30e$ are positioned in substantially the same X-axis position as in the first linear guide $30c_1$, that functions as the tilting fulcrum of the travelling frame 30, the pinions will not move up and down even if the travelling frame 30 were to be tilted as described above. The gouging between the pinion $30e$ and the rack $30f$ will, therefore, not occur.

The above-described robot main body 31 is slidably supported, via linear guides $31b$, by guide rails $31a$ which are respectively fixed on the upper surface of the upper beam member $30a$ and on a front surface of the lower beam member $30a$. The robot main body 31 is driven by engaging a pinion $31c$ to be connected to a Y-axis electric motor My which is mounted on a front surface of the robot main body $31b$, with a rack $31d$ which is fixed to the front surface of the upper beam member $30a$ of the travelling frame 30. The robot main body 31 can therefore be driven in the Y-axis direction. The elevating arm 32 is made up of a cylindrical arm main body $32a$ and a plate-like slide base $32b$ which is fixed to the arm main body $32a$. The elevating arm 32 is slidably supported, at a pair of guide rails $32c$ which are fixed to the rear surface of the slide base $32a$, by linear guides $32d$ on the front surface of the robot main body 31. A pinion $32e$ to be connected to a Z-axis electric motor Mz which is mounted on the robot main body 31 is engaged with a rack $32f$ which is fixed to the rear surface of the slide base $32b$ so as to drive the elevating arm 32 in the Z-axis direction. Here, the Z-axis electric motor Mz is mounted on the rear side of the robot main body 31 so as to be inserted between the upper and the lower beam members $30a$, $30b$ of the travelling frame 30. In this manner, the distance between both the beam members $30a$, $30a$ is utilized as a space for disposing the X-axis electric motor Mx and the Z-axis electric motor Mz to improve the space efficiency.

Figure 5:
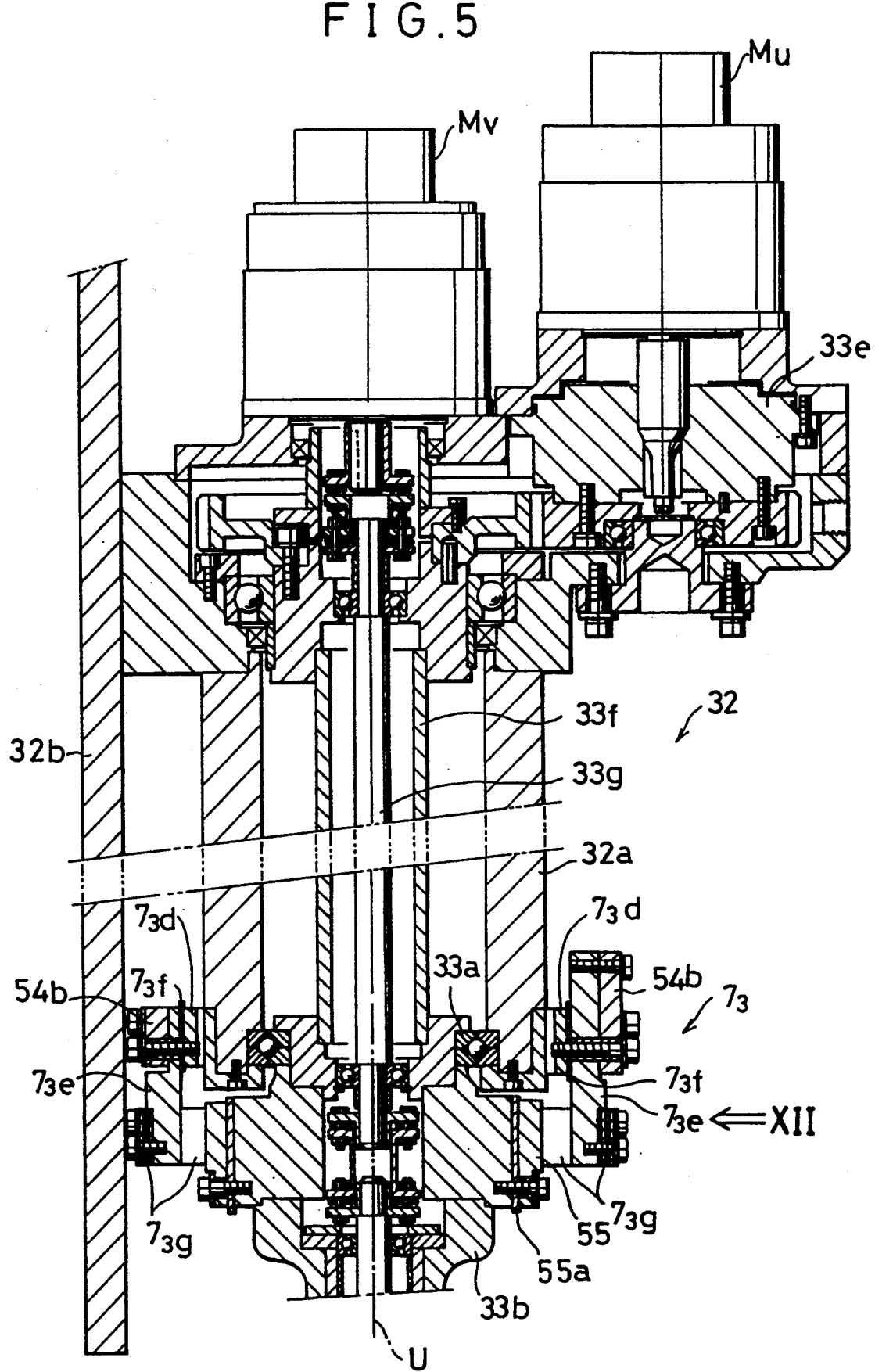
FIG. 5 is an enlarged sectional view taken along the line V—V in FIG. 1.
Figure 6:
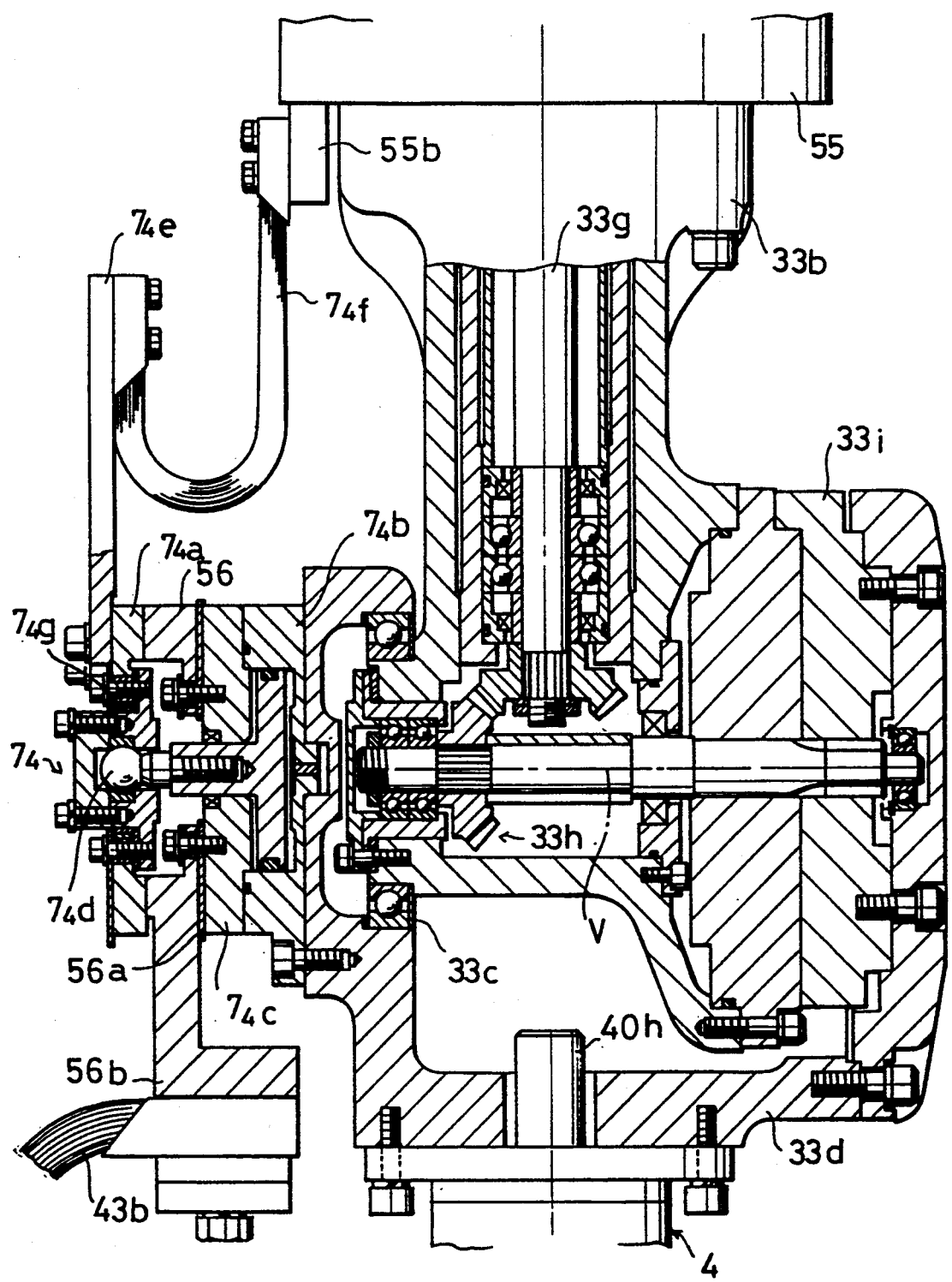
FIG. 6 is an enlarged sectional view taken along the line VI—VI in FIG. 3.

As shown in FIGS. 5 and 6, the wrist portion 33 is made up of a wrist main body $33b$ which is supported at a lower end of the arm main body $32a$ via a bearing $33a$ so as to be rotatable about the U-axis, and a tool holder $33d$ which is supported at a lower end of the wrist main body $33b$ via a bearing $33c$ so as to be rotatable about the V-axis. A U-axis electric motor Mu and a V-axis electric motor Mv are mounted on an upper end of the arm main body $32a$. A hollow driving shaft $33f$ to be driven by the U-axis electric motor Mu via a coaxial reduction gear $33e$ such as one known by the Trade Name of "Cyclo reduction gear" is inserted into the arm main body $32a$ to connect it to the wrist main body $33b$. A driving shaft $33g$ to be connected to the V-axis electric motor Mv is inserted through the driving shaft $33f$ and the wrist main body $33b$ to connect the driving shaft $33g$ to the tool holder $33d$ via a bevel gear $33h$ and a coaxial reduction gear $33i$. It is thus so arranged that the wrist main body $33b$ and the tool holder $33d$ can be rotated by the U-axis electric motor Mu and the V-axis electric motor Mv about the U-axis and the V-axis, respectively.

Figure 7:
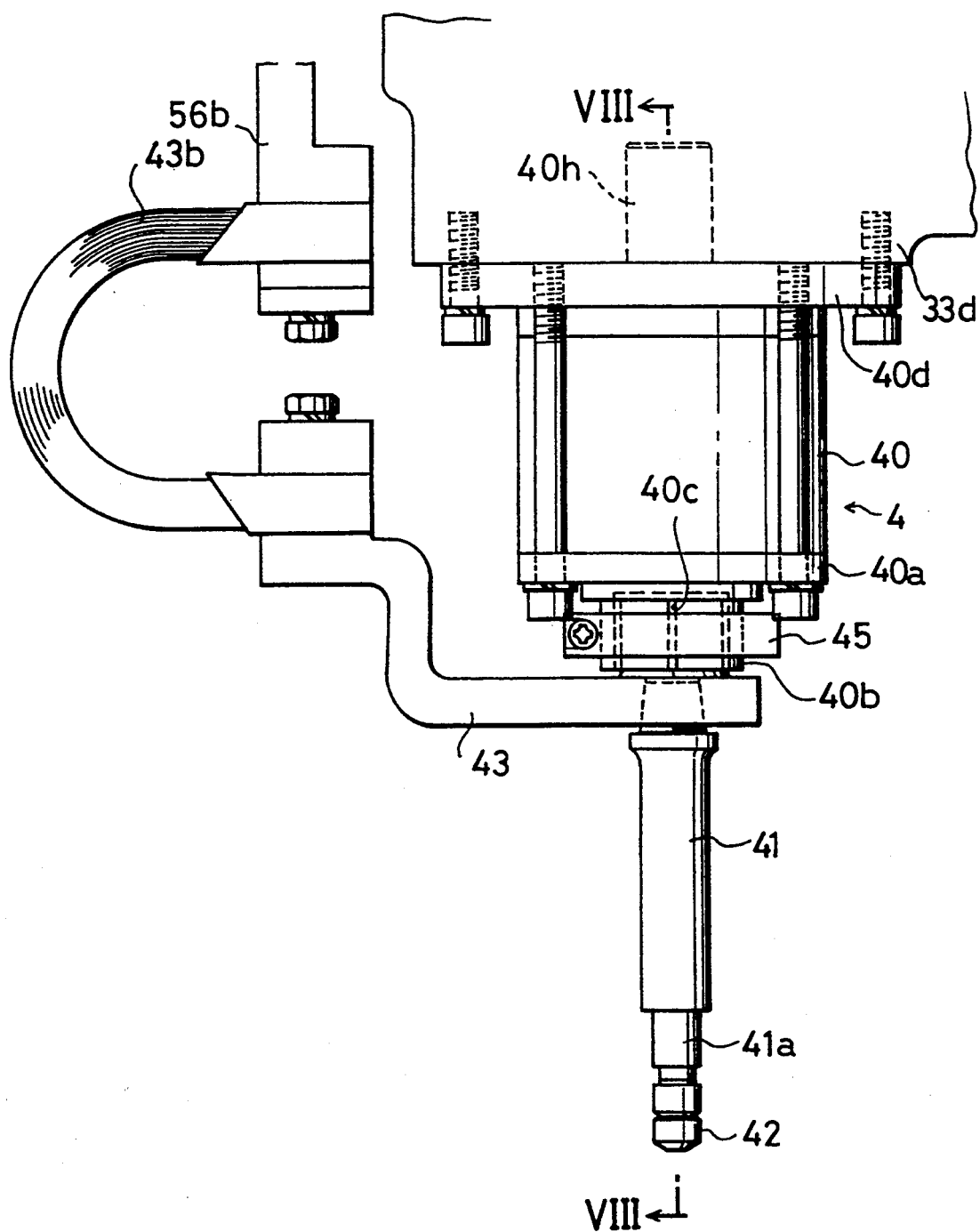
FIG. 7 is an enlarged front view of a stud welding gun.

As shown in FIG. 7, the stud welding gun 4 is made up of a pressing cylinder 40 and an electrode 42 which is mounted via an electrode holder 41 on a piston rod $40b$ which projects out of a front cover $40a$ at a front end of the pressing cylinder 40. Electric power is supplied to the electrode 42 via a power receiving terminal 43 and the electrode holder 41.

Figure 8:
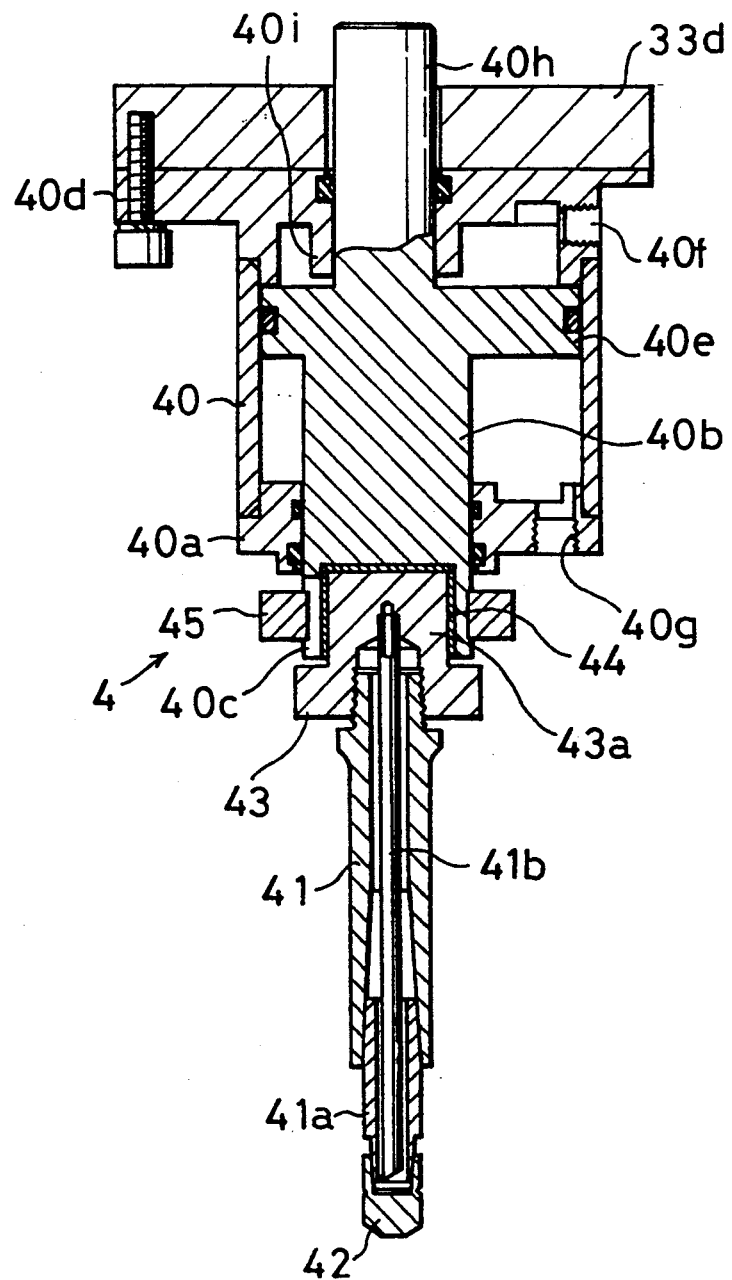
FIG. 8 is a sectional view taken along the line VIII—VIII in FIG. 7.

As shown in FIG. 8, the power receiving terminal 43 is fitted into a concave hole formed in a front end portion of the piston rod $40b$, at a convex portion $43a$ formed on a base portion of the terminal 43 via an electrically insulating material 44. At the front end of the piston rod $40b$ there is formed a slit $40c$ which is positioned in one peripheral side of the concave hole. The power receiving terminal 43 is fixed by fastening with a fastening ring 45 which is mounted on an external periphery of the front end of the piston rod 40b. To the base end of the power receiving terminal 43 the electrode holder 41 is firmly screwed at its rear end in an axially the same position as the piston rod 40b so that the electrode 42 can be mounted on a front end of the electrode holder 41 via a sub-holder 41a. Inside the electrode holder 41 there is inserted a cooling water pipe 41b so that cooling water can flow through the pipe 41b via an unillustrated passage formed in the power receiving terminal 43.

The pressing cylinder 40 is mounted on the tool holder 33d at a rear cover 40d on the rear end thereof. A pressurized fluid is caused to flow into a pressure chamber between the rear cover 40d and the piston 40e inside the pressing cylinder 40, through a port 40f which is formed on a periphery of the rear cover 40d. The piston rod 40b is thus moved forwards to cause the electrode 42 to abut the workpiece to thereby press it. In this condition, the electric power is supplied to the electrode 42 to carry out the welding. After the welding, the pressurized fluid is caused to flow through a port 40g formed in a front cover 40a to move the piston rod 40b backwards.

By the way, if the direction of pressing the electrode 42 is inclined relative to the surface of the workpiece, a bending load and a rotation force due to the pressure reaction force will operate on the piston rod 40b. Therefore, the following arrangement has been employed in this embodying example. Namely, the piston rod 40b is made to be eccentric relative to the piston 40e to prevent the piston rod 40b from rotating relative to the pressing cylinder 40. Further, there is provided a guide rod 40h which extends rearwards to penetrate the rear cover 40d. The piston rod 40b is supported by the front cover 40a and by the rear cover 40d via the guide rod 40h so as to increase the supporting rigidity of the piston rod 40b against the bending load. If the guide rod 40h is formed large in diameter, the pressure receiving area of the piston 40e to receive the pressurized fluid that flows in from the port 40f is reduced, with the result that the pressing force onto the workpiece will decrease. Therefore, the guide rod 40h is formed smaller in diameter than the piston rod 40b and, on the other hand, a boss portion 40i through which the guide rod 40h is inserted is provided in a projecting manner on the inner surface of the rear cover 40d. A large length of inserting the guide rod 40h through fitting is thereby preserved by the boss portion 40i in order to secure a sufficient supporting rigidity even if the guide rod 40h is made small in diameter.

Referring to FIGS. 1 and 3, there is provided a welding power source 5, on one side of the disposing portion of the jig unit 1. One of the output terminals of the welding power source 5 is connected, via a cable 50 and a power supply joint 6 provided in the jig unit 1, to the welding jig 11 that is located in the welding position. Further, a power supply passage is provided respectively on the travelling frame 30, the robot main body 31, the elevating arm 32, the wrist main body 33b, and the tool holder 33d so that the other of the output terminals of the welding power source 5 can be connected to the power receiving terminal 43 of the stud welding gun 4 via a cable 51 and these power supply passages.

Figure 9:
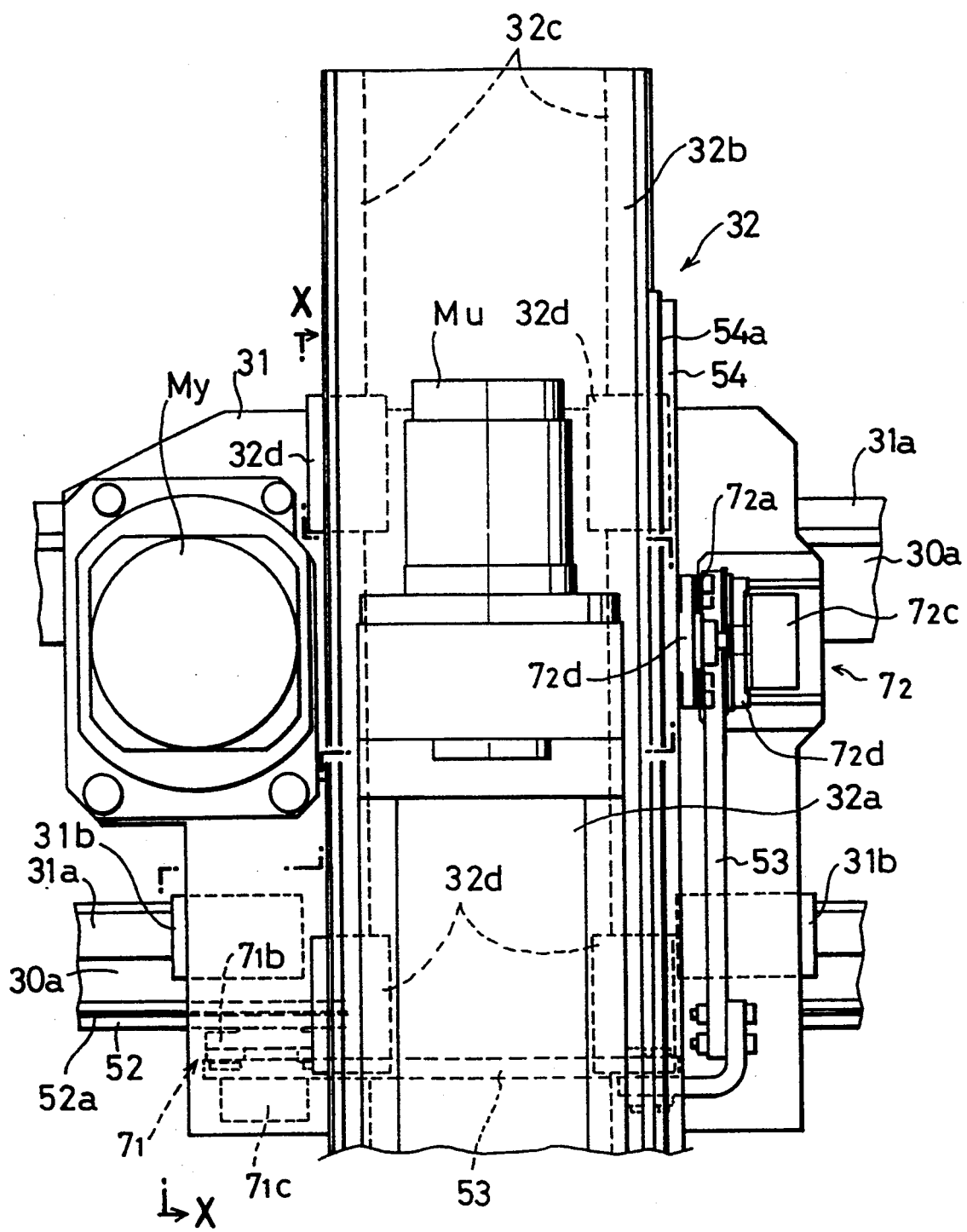
FIG. 9 is an enlarged front view of a robot main body and an elevating arm.
Figure 10:
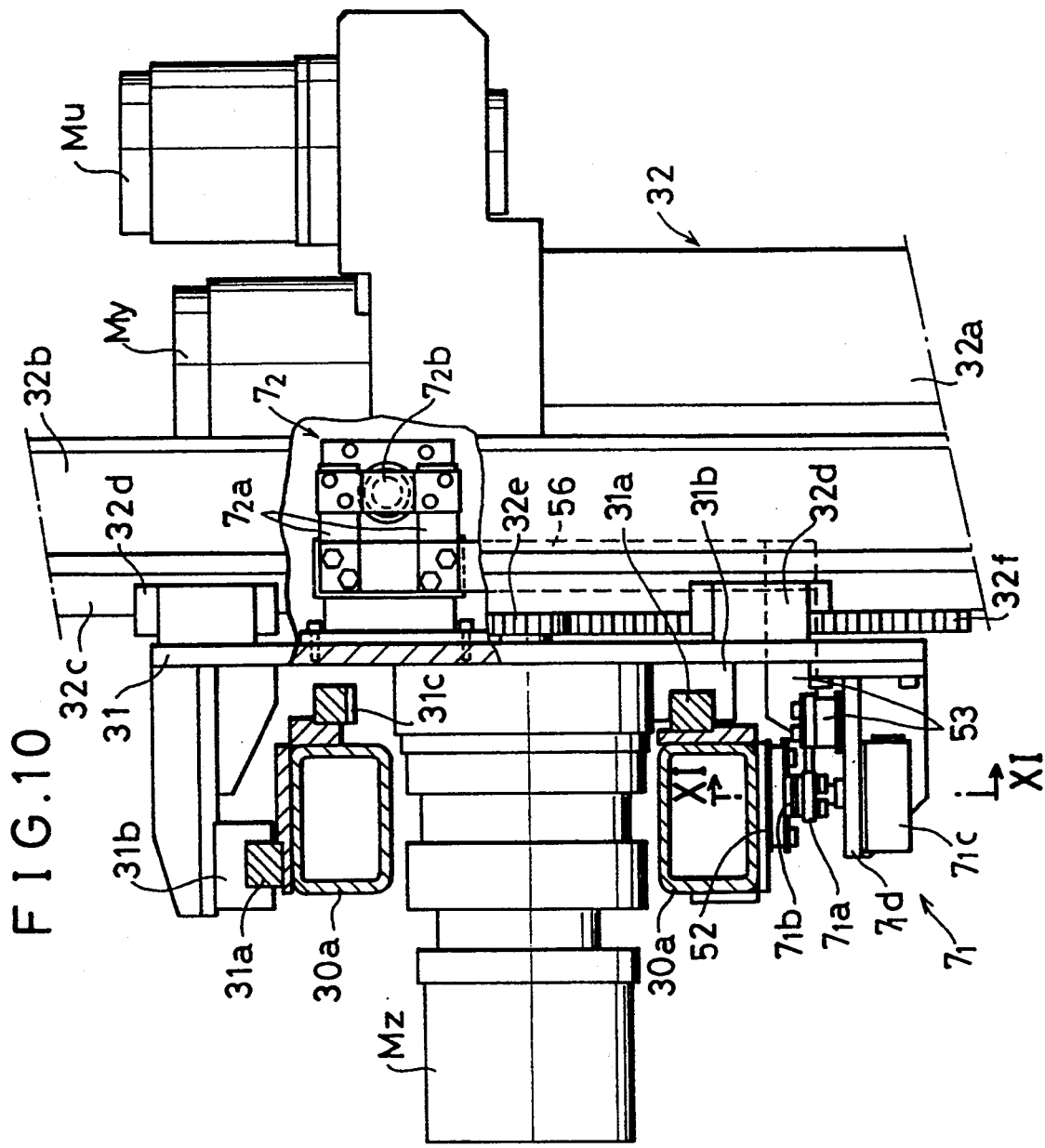
FIG. 10 is a sectional view taken along the line X—X in FIG. 9.

The power supply passage to be provided on the travelling frame 30 is made up of a first power supply bar 52 which is elongated in the Y-axis direction with the above-described cable 51 connected to one end thereof and which is fixed, via an electrically insulating material 52a, to the lower surface of the lower beam member 30a of the travelling frame 30. The power supply passage 53 provided on the robot main body 31 is connected, as shown in FIGS. 9 and 10, to the first power supply bar 52 via a first power supply joint $7_1$ which is provided on a lower rear surface of the robot main body 31. The power supply passage 53 is also connected, via a second power supply joint $7_2$ provided in a front side portion of the robot main body 31, to a second power supply bar 54 which is elongated in the Z-axis direction to constitute the power supply passage on the side of the elevating arm and which is fixed, via an electrically insulating material 54a, to a side edge of the slide base 32b of the elevating arm 32.

Figure 11:
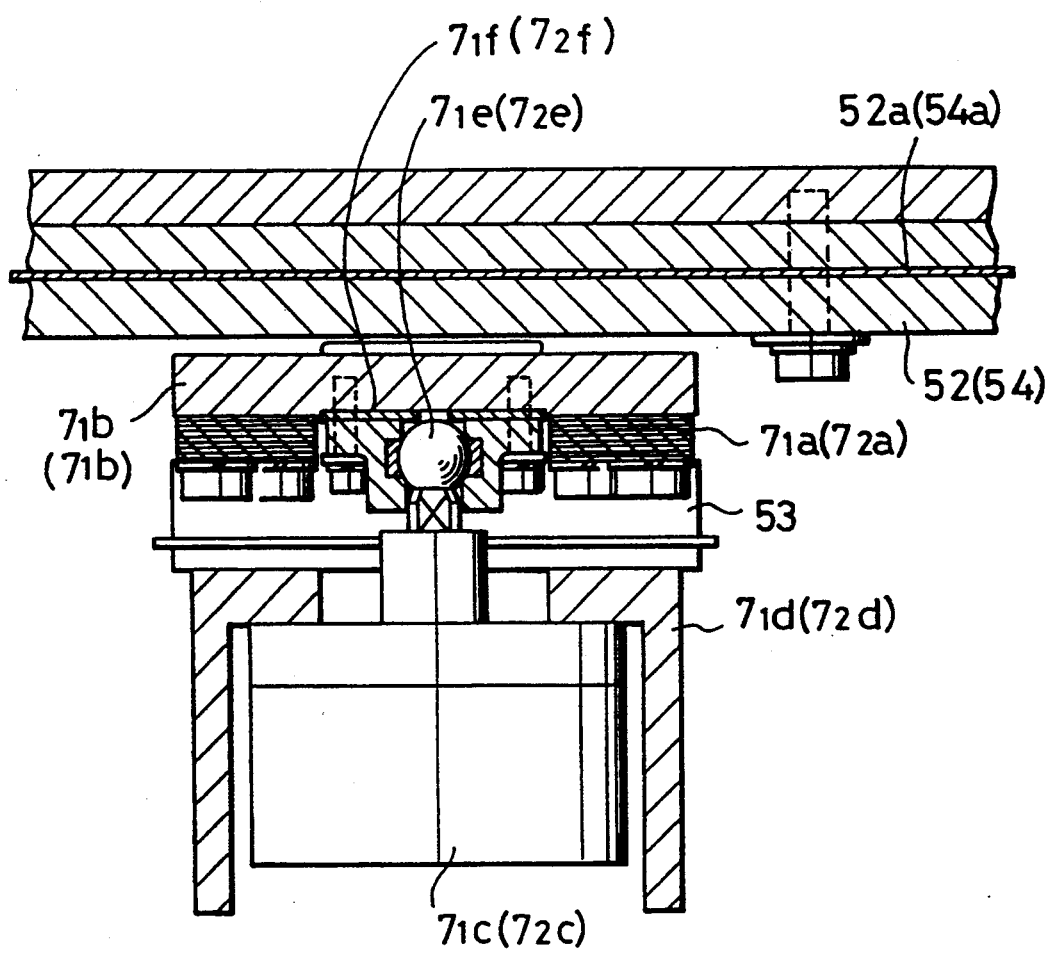
FIG. 11 is an enlarged sectional view taken along the line XI—XI in FIG. 10.
Figure 12:
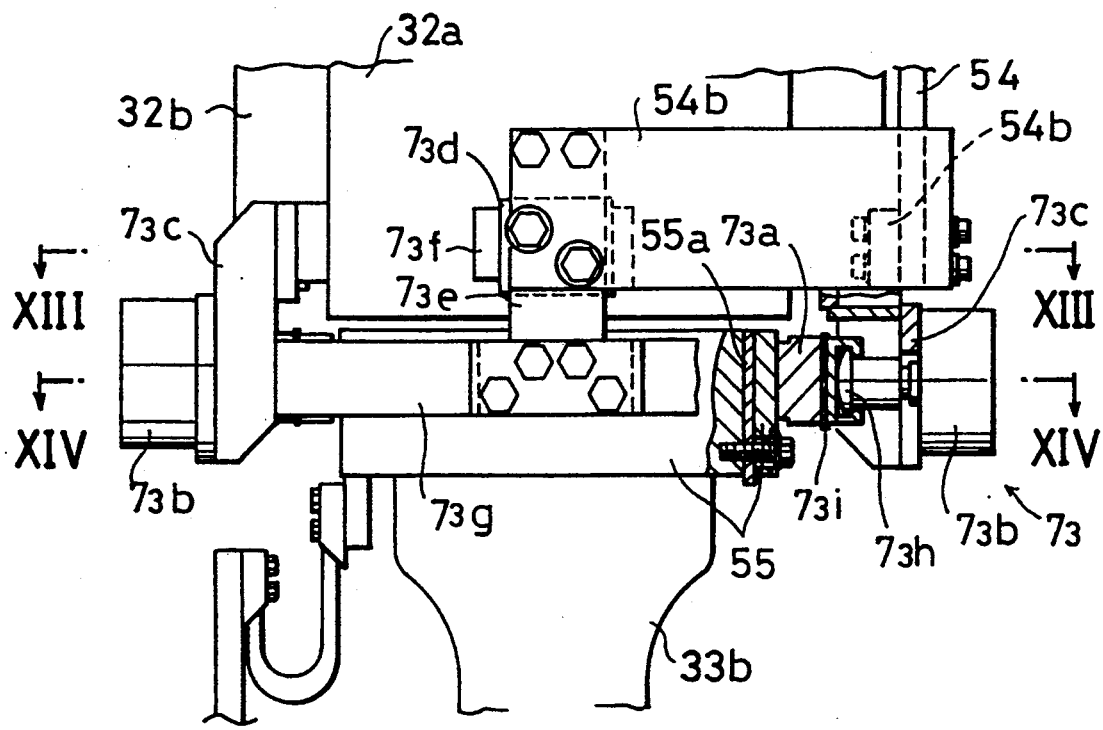
FIG. 12 is a front view as viewed from an arrow XII in FIG. 5.
Figure 13:
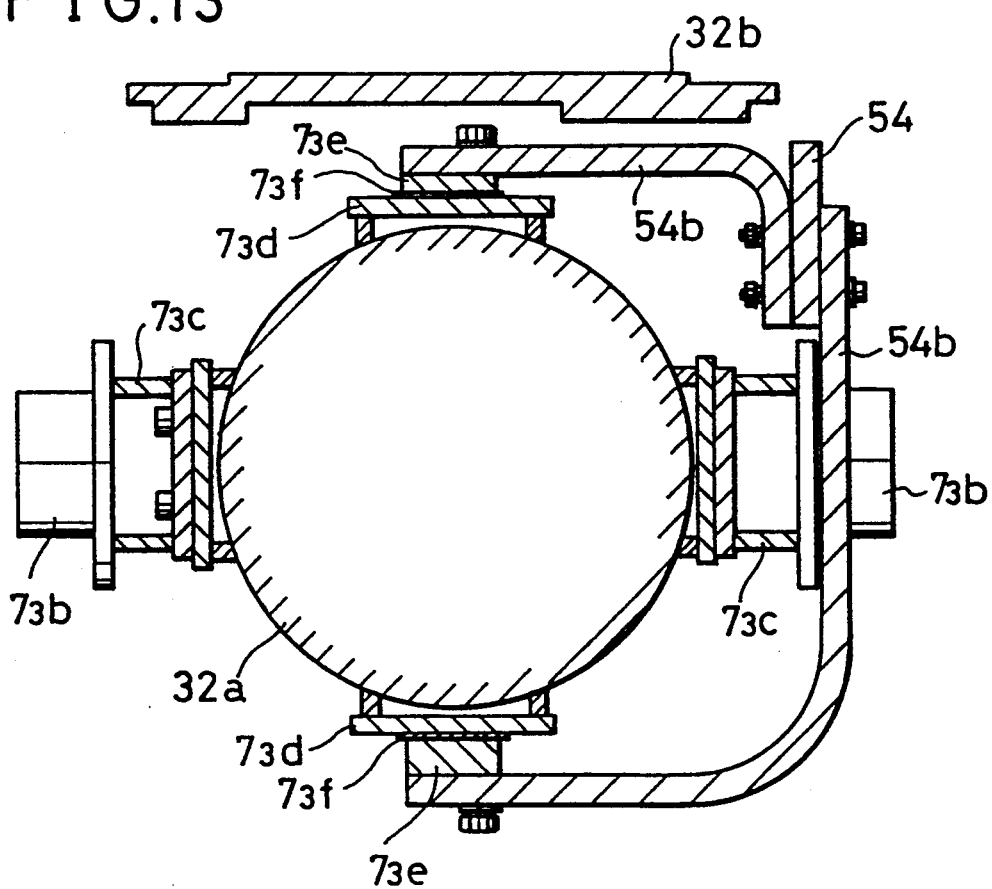
FIG. 13 is a sectional view taken along the line XIII—XIII in FIG. 12.
Figure 14:
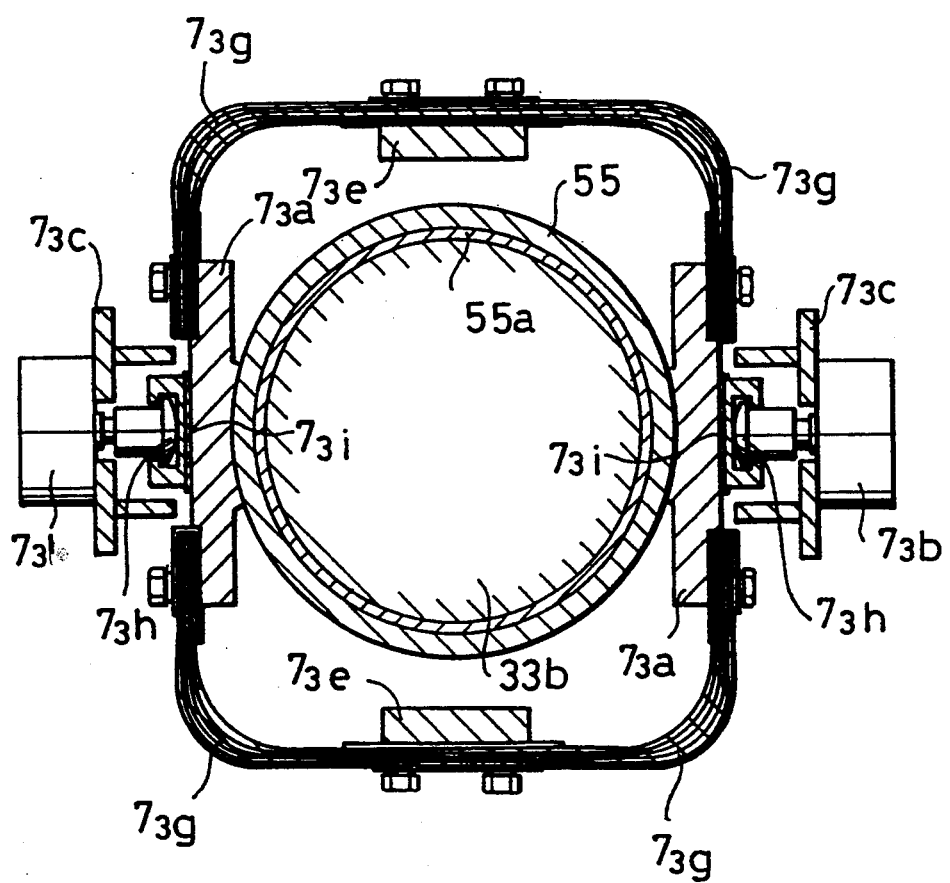
FIG. 14 is a sectional view taken along the line XIV—XIV in FIG. 12.

Each of the power supply joints $7_1$, $7_2$ is formed into a pressure type joint made up of a contact member $7_1b$, $7_2b$ which is connected to each terminal of the power supply passages 53 via a flexible electrically conductive member $7_1a$, $7_2a$ comprising an ounce metal, and a cylinder $7_1c$, $7_2c$ for moving the contact member $7_1b$, $7_2b$ into, and out of, contact with the respective power supply bars 52, 54. Each of the cylinders $7_1c$, $7_2c$ is mounted on a bracket $7_1d$, $7_2d$ fixed to the robot main body 31. The contact member $7_1b$, $7_2b$ of the respective power supply joints $7_1$, $7_2$ is connected, as shown in FIG. 11, to a piston rod of the cylinder $7_1c$, $7_2c$ in an oscillating manner via a ball joint $7_1e$, $7_2e$ so as to secure a close contact with the respective power supply bars 52, 54. In the drawings, numerals $7_1f$, $7_2f$ denote electrically insulating materials interposed between the contact members $7_1b$, $7_2b$ and the ball joints $7_1e$, $7_2e$.

When the workpiece is pressed by the stud welding gun 4, a pressure reaction force in the X-axis, Y-axis or Z-axis direction operates on the robot 3. The pressure reaction force in the X-axis direction is received by the rack and pinion mechanism for driving the travelling frame 30. The pressure reaction force in the Y-axis direction is received by the rack and pinion mechanism for driving the robot main body 31. The pressure reaction force in the Z-axis direction is received by the rack and pinion mechanism for driving the elevating arm 32. Here, since the rack and pinion mechanism for the travelling frame 30 is provided in a pair in a symmetrical manner in the Y-axis direction, the pressure reaction force in the X-axis direction can be duly received (i.e., received without undue force) by the pair of rack and pinion mechanism. However, since the rack and pinion mechanism for the robot main body 31 and the rack and pinion mechanism for the elevating arm 32 are respectively provided only in one in number, the rack and pinion mechanism is likely to be subjected to wear by the pressure reaction force in the Y-axis or the Z-axis direction.

However, if the first power supply joint $7_1$ and the second power supply joint $7_2$ are constituted, like in this embodying example, by pressure type joints, the wear on the pinion mechanism is less likely to occur for the following reasons. Namely, the pressure reaction force in the Y-axis or the Z-axis direction can be received by the friction force between the contact member $7_1b$, $7_2b$ of each power supply joint $7_1$, $7_2$ and each power supply bar 52, 54. As a result, the pressure reaction force in the Y-axis or Z-axis direction to operate on the rack and pinion mechanism of the robot main body 31 or the rack and pinion mechanism of the elevating arm 32 can be reduced, and these rack and pinion mechanisms are therefore less likely to be subjected to wear.

Further, in the present embodying example, since the contact member $7_1b$ of the first power supply joint $7_1$ is arranged to strongly contact the first power supply bar 52 from the lower side upwards, a counterclockwise angular moment about the Y-axis, as seen in FIGS. 3 and 10, will operate on the robot main body 31 with the linear guide 31$b$ therebelow operating as a fulcrum, due to the pressure reaction force against pressed contact of the contact member $7_1b$. Here, if the workpiece is pressed by the stud welding gun 4 from the rear side in the X-axis direction, a clockwise angular moment due to the pressure reaction force of the stud welding gun 4 will operate on the robot main body 31 in addition to a clockwise angular moment due to the weight of the elevating arm 32. As a result, the robot main body 31 tends to tilt in the clockwise direction relative to the travelling frame 30. In this embodying example, however, due to the pressure reaction force of the contact members $7_1b$ of the first power supply joint $7_1$, the counterclockwise angular moment operates on the robot main body 31 as described above. Therefore, the clockwise angular moment against pressing by the stud welding gun 4 will be canceled by this counterclockwise angular moment and, consequently, no undue force will be applied to the supporting portion of the robot main body 31.

In the above-described embodying example, the contact member $7_1b$ is arranged to be strongly urged or pressed upwards from the lower side against the first power supply bar 52 that is fixed to the lower surface of the lower beam member 30$a$ of the travelling frame 30. However, the following arrangement may also be employed. Namely, the first power supply bar is fixed, in a position below the guide rail 31$a$, to a front side of the lower beam member 30$a$ of the travelling frame 30, and the contact member is urged into strong contact with the first power supply bar from the front side thereof so that a counterclockwise angular moment due to the pressure reaction force is caused to be operated on the robot main body 31.

In the periphery of the wrist main body 33$b$, there is provided a third power supply joint $7_3$ which connects the second power supply bar 54 to the power supply passage which is provided on the wrist main body 33$b$. Further, on the axis of rotation of the tool holder 33$d$, there is provided a fourth power supply joint $7_4$ which connects the power supply passage provided on the wrist main body 33$b$ to the power supply passage provided on the tool holder 33$d$.

As shown in FIGS. 5 and 12 through 14, the third power supply joint $7_3$ is formed into a pressure type joint. This pressure type joint is made up of an electrically conductive ring 55 which is fitted, via an electrically insulating material 55$a$, onto an outer periphery of the wrist main body 33$b$ and which constitutes the power supply passage on the side of the wrist main body 33$b$, and a pair of contact members $7_3a$, $7_3a$ which are connected to the second power supply bar 54 and which are movable into, and out of, contact with the electrically conductive ring 55 from diametrically opposite directions thereof by means of a pair of cylinders $7_3b$, $7_3b$. Each of the cylinders $7_3b$ is mounted on a bracket $7_3c$ which is vertically downwardly provided on an external lower periphery of the arm main body 32$a$ of the elevating arm 32 on diametrically opposite positions thereof. Further, there are fixedly provided a pair of brackets $7_3d$, $7_3d$ on an outer periphery of the arm main body 32$a$ at a position 90° offset in phase from the brackets $7_3c$. On these brackets $7_3d$, $7_3d$ there are respectively mounted, via an electrically insulating material $7_3f$, a pair of tap members $7_3e$, $7_3e$ which are made up of vertically elongated copper plates. Both the tap members $7_3e$, $7_3e$ are arranged to be positioned in the diametrically opposite positions of the electrically conductive ring 55 which are at right angles to the diametrically opposite positions. The second power supply bar 54 is connected to the tap members $7_3e$, $7_3e$ via a pair of rigid electrically conductive members 54$b$, 54$b$ which are connected to the lower end portion of the second power supply bar 54. Both the end portions of respective contact members $7_3a$, $7_3a$ are connected to the tap members $7_3e$, $7_3e$ via a pair of flexible electrically conductive members $7_3g$, $7_3g$ which are made up of ounce metals.

By the way, the following arrangement may also be considered. Namely, the contact member $7_3a$ of the third power supply joint $7_3$ is made in one in number, and the contact member $7_3a$ is made to pressingly contact one peripheral side of the electrically conductive ring 55. However, in such an arrangement, an unbalanced load will operate on the wrist main body 33$b$, so that an undue force will operate on the bearing 33$a$. On the other hand, in this embodying example, since the pair of contact members $7_3a$, $7_3a$ are caused to pressingly contact the electrically conductive ring 55 from diametrically opposite sides, there will operate no unbalanced load on the wrist main body 33$b$. Therefore, no undue force will be applied to the bearing 33$a$.

In case the pair of contact members $7_3a$, $7_3a$ are provided, it is necessary to equalize the wiring length between both the contact members $7_3a$, $7_3a$ and the second power supply bar 54. Therefore, there is provided the pair of tap members $7_3e$, $7_3e$ as described above. In order to prevent flexible electrically conductive members $7_1g$ provided between the contact members $7_3a$ and the tap members $7_3e$ from extending outwards with the result that the third power supply joint $7_3$ increases its in external diameter, it is preferable to dispose the flexible electrically conductive members $7_3g$ along the electrically conductive ring 55 without bending them into a U-shape. In this case, the connecting ends of the flexible electrically conductive members $7_3g$ to the contact members $7_3a$ tend to perform arcuate movements with the tap members $7_3e$ functioning as fulcrums as a consequence of the movement of the contact members $7_3a$ into, and out of, contact with the electrically conductive ring 55. As a result, an unbalanced load will operate on the contact members $7_3a$ at right angles to the direction of movement into, and out of, contact, i.e., in a tangential direction of the electrically conductive ring 55. In this embodying example, however, since the pair of flexible electrically conductive members $7_3g$, $7_3g$ are connected to both the end portions of respective contact members $7_3a$, the unbalanced load to operate in one tangential direction via one flexible electrically conductive member $7_3g$ is canceled by the unbalanced load to operate in the opposite tangential direction via the other flexible electrically conductive member $7_3g$. Consequently, the contact members $7_3a$ can smoothly be moved into, and out of, contact with the electrically conductive ring 55 without their being subjected to an unbalanced load, and there will occur no gouging of the cylinders $7_3b$. In order to secure a close contact of the contact members $7_3a$ with the periphery of the electrically conductive ring 55, the contact members $7_3a$ are respectively connected in an oscillating manner to the piston rods of the cylinders 73b via ball joints 73h. In the drawings, numeral 73i denotes electrically insulating members which are interposed between the contact members 73a and the ball joints 73h.

The fourth power supply joint 74 is formed into a pressure type joint as shown in FIG. 6. Namely, it is made up of an annular electrically conductive plate 56 which constitutes the power supply passage on the side of the tool holder 33d, and a contact member 74a which is connected to the electrically conductive ring 55 and is movable into, and out of, contact with the electrically conductive ring 55 by means of a cylinder 74b. In more detail, the cylinder 74b is mounted on an outside surface of the tool holder 33d in a position on the V-axis which is the axis of its rotation. The annular electrically conductive plate 56 is fixed to a front cover 74c of the cylinder 74b via an electrically insulating material 56a, and the contact member 74a is disposed opposite in the V-axis direction to the annular electrically conductive plate 56. The contact member 74a is connected to the front end of that piston rod of the cylinder 74b which projects through the front cover 74c, in a rotatable and oscillating manner via a ball joint 74d. This contact member 74a is provided with a terminal 74e which extends upwards. This terminal 74e is connected to a downwardly extending terminal 55b which is formed in the electrically conductive ring 55, via a flexible electrically conductive member 74f made up of an ounce metal. A downwardly extending terminal 56b is formed on the annular electrical conductive plate 56 and to this terminal 56b is connected the power receiving terminal 43 of the stud welding gun 4 via an electrically conductive member 43b made up of an ounce metal. Further, in order to reduce the dimension in the V-axis direction of the fourth power supply joint 74, the contact member 74a is formed in an annular shape and the ball joint 74d is mounted in its internal periphery via an electrically insulating material 74g.

By the way, the following arrangement may also be considered. Namely, an electrically conductive plate to be connected to the electrically conductive ring 55 is fixed to the wrist main body 33b via a bracket or the like so as to be positioned on the V-axis, and the contact member to be connected to the power supply passage on the side of the tool holder 33d is connected to the piston rod of the cylinder 74b that is mounted on the tool holder 33d. The contact member is thus pressingly urged against the electrically conductive plate. In this arrangement, however, the pressing force will operate between the wrist main body 33b and the tool holder 33d, giving a bad effect on the strength of, and the positioning accuracy of, the stud welding gun 4. On the other hand, according to this embodying example, when the cylinder is contracted to bring the contact member 74a into strong contact with the annular electrically conductive plate 56, the pressing force of the cylinder 74b is received by the front cover 74c of the cylinder 74b via the contact member 74a and the annular electrically conductive member 56. The pressing force does not therefore operate on members other than the fourth power supply joint 74 and there is accordingly no disadvantage as described above. It is further possible to prepare in advance an assembled unit by assembling the contact member 74a and the annular electrically conductive plate 56 with the cylinder 73b. In this manner, the ease with which the fourth power supply joint 74 can be attached to the wrist portion 33 is improved.

When the tool holder 33d is rotated in a condition in which the cylinder 74b is extended and the contact member 74a is consequently placed out of contact with the annular electrically conductive plate 56, the cylinder 74b is rotated relative to the contact member 74a that is prevented from rotating with respect to wrist main body 33b. However, since the piston rod is allowed to rotate relative to the contact member 74a by means of the ball joint 74d, the piston rod rotates integrally with the cylinder 74b. There is therefore no disadvantage in that wear occurs to a sealing member mounted on the piston inside the cylinder 74a or a sealing member mounted in the rod penetrating hole in the front cover 74c, due to the rotation of the piston rod relative to the cylinder 74b. Further, when the cylinder 74b is contracted to thereby move the contact member 74a into strong contact with the annular electrically conductive plate 56, the contact member 74a can be securely adhered to the entire circumferential surface of the annular electrically conductive plate 56 through the oscillating movement of the contact member 74a with the ball joint 74d working as a fulcrum. The electric power supply to the stud welding gun 4 can thus be made without a loss.

In welding the workpiece, the following procedures are followed. Namely, in a condition in which each of the contact members of the first through the fourth power supply joints 7₁–7₄ has been moved out of contact with the mating member, the travelling frame 30, the robot main body 31, the elevating arm 32, the wrist main body 33b and the tool holder 33d are moved to fix the positioning of the stud welding gun 4 to the position that is opposite each of the welding spots of the workpiece mounted on the welding jig 11 that is in the welding position. Then, each of the contact members of the first through the fourth power supply joints 7₁–7₄ is strongly pressed against the mating member. Thereafter, the pressing cylinder 40 of the stud welding gun 4 is operated to abut the electrode 42 with the welding spot of the workpiece. In this condition, the electric power is supplied from the welding power source 5 to the electrode 42 of the stud welding gun 4 via the cable 51, the first power supply bar 52, the first power supply joint 7₁, the power supply passage 53 on the side of the robot main body 31, the second power supply joint 7₂, the second power supply bar 54, the third power supply joint 7₃, the electrically conductive ring 55, the fourth power supply joint 74, the annular electrically conductive plate 56 and the power receiving terminal 43.

Figure 15:
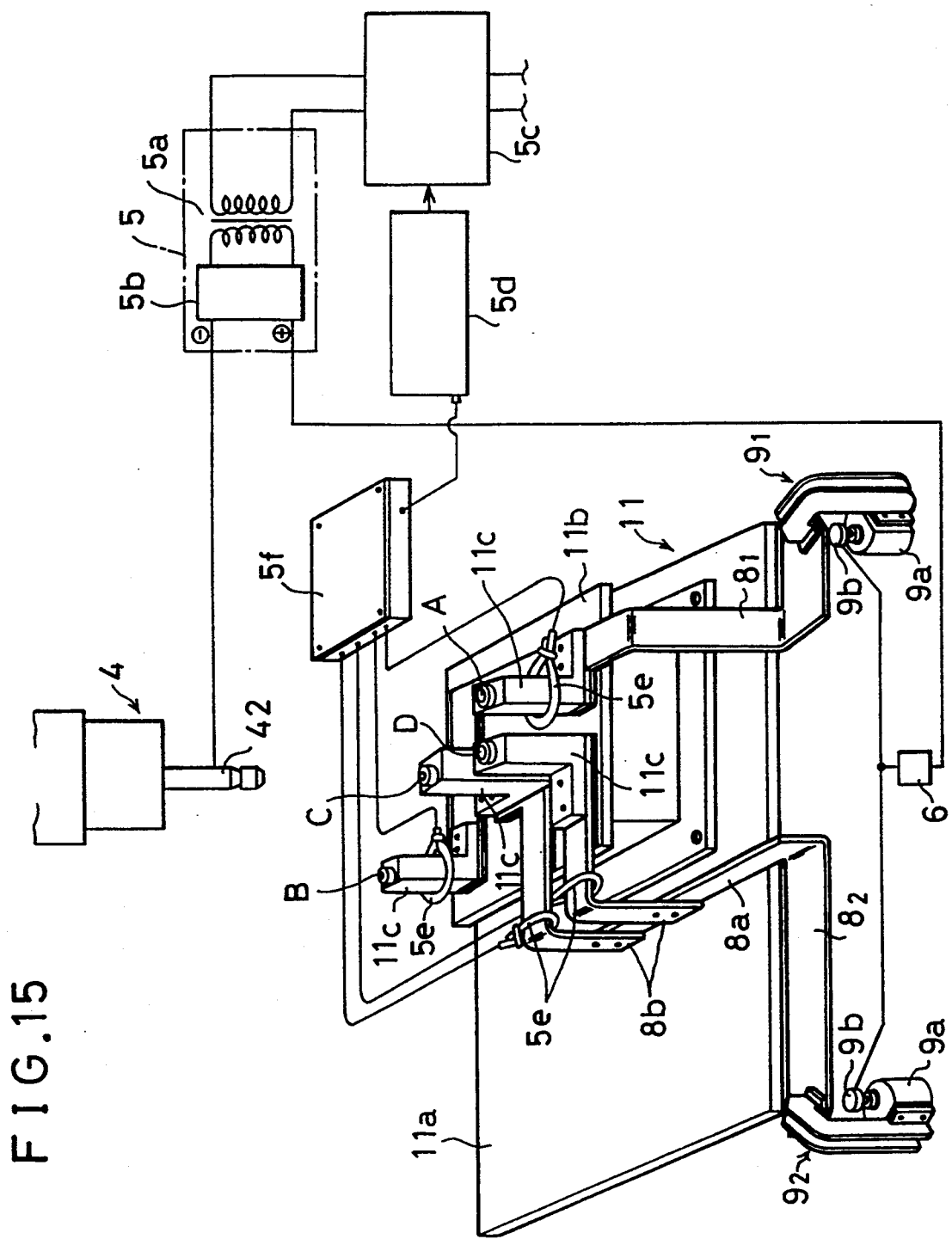
FIG. 15 is a diagram showing the power supply system.

The welding jig 11 is provided, as shown in FIG. 15, with a plurality of back electrodes 11c via a supporting bed 11b on a jig base 11a. Each of the back electrodes 11c is arranged to abut each of the welding spots of the workpiece that is to be set on the welding jig 11. Welding is carried out by the electrode 42 of the stud welding gun 4 in a condition in which each of the welding spots of the workpiece is pinched between each of the back electrodes 11c and the electrode 42, by causing the electric current from the welding power source 6 to flow through the electrode 42 and the back electrodes 11c.

The welding power source 5 is made up of a transformer 5a and a rectifier 5b on the secondary side thereof. A negative output terminal of the rectifier 5b is connected to the electrode 42 of the stud welding gun 4 via the above-described route, and a positive output terminal thereof is connected to the back electrodes 11c. Further, a contactor 5c which is made up of a thyristor or the like is provided on the primary side of the transformer 5a. The welding current and the welding time (or duration) are thus controlled by a controller 5d via the contactor 5c.

The above-described plurality of back electrodes 11c are classed into a plurality of groups while preventing, to the best extent possible, nearby electrodes from belonging to the same group. In the present embodying example, the back electrodes are grouped into a first group to which two separated apart back electrodes 11c, 11c as marked A, B belong and a second group to which two separated apart back electrodes 11c, 11c as marked C, D belong. The electric power supply route $8_1$ for the first group and an electric power supply route $8_2$ for the second group are provided so that the electric power can be separately supplied to the back electrodes 11c of each group via each of the electric power supply routes $8_1$, $8_2$. The welding jig 11 is provided with a pair of first and second connectors $9_1$, $9_2$ each having a contact 9b which is moved into, and out of, contact by means of a cylinder 9a. Both the connectors $9_1$, $9_2$ are connected, via the power supply joint 6 to be provided in the jig unit 1, to the welding power source 5, i.e., to the positive output terminal of the above-described rectifier 5b.

When welding is carried out on the welding spots coinciding with the back electrodes 11c marked A, B which belong to the first group, the first power supply route $8_1$ is connected to the welding power source 5 via the first connector $9_1$. At the same time, the second connector $9_2$ is opened to cut off the second power supply route $8_2$ from the welding power source 5. According to this operation, that shunt current of the welding electric current which flows to the back electrodes 11c marked C, D that are present close to the back electrodes 11c marked A, B can be restrained. When welding is carried out on the welding spots coinciding with the back electrodes 11c marked C, D which belong to the second group, the first connector $9_1$ is opened and, at the same time, the second connector $9_2$ is closed to thereby connect the second power supply route $9_2$ to the welding power supply source 5. In this case, though the shunt current to the back electrodes 11c marked A, B does not occur, since the electrodes 11c, 11c marked C, D that are closely positioned with each other are classed into the same second Group in this embodying example, shunt current is likely to occur within the same group.

Therefore, as a measure to counter the shunt current, the following arrangement has been employed. Namely, to the main power passage 8a of the second power supply route $8_2$, there are connected via respective connecting members 8b the back electrodes 11c marked C, D by independently branching. A troidal coil 5e, as a means for detecting an electric current, is externally mounted on each of the connecting members 8b. There is provided a selector 5f for selectively inputting signals from these troidal coils 5e to the controller 5d. When welding is carried out on the welding spots coinciding with each of the electrodes 11c marked C, D, the electric current to flow through each of the back electrodes 11c is detected by the troidal coil 5e that is externally mounted on the respective connecting members 8b. The detected electric current is then inputted to the controller 5d via the selector 5f to perform a feed back control such that a required electric current flows to the welding spot being welded.

In this embodying example, a troidal coil 5e is also externally mounted on each of the back electrodes 11c marked A, B so that a feed back control of the welding electric current can be made to the welding spot coinciding with each of the back electrodes 11c.

In the above-described embodying example, on the turn table 10 of the jig unit 1, there are mounted welding jigs 11 in a pair so that, while welding is being carried out for the workpiece on the welding jig 11 that is in the welding position, the welded workpiece can be discharged out of the welding jig 11 that is in the setting position, thereby setting the next workpiece instead.

Figure 16:
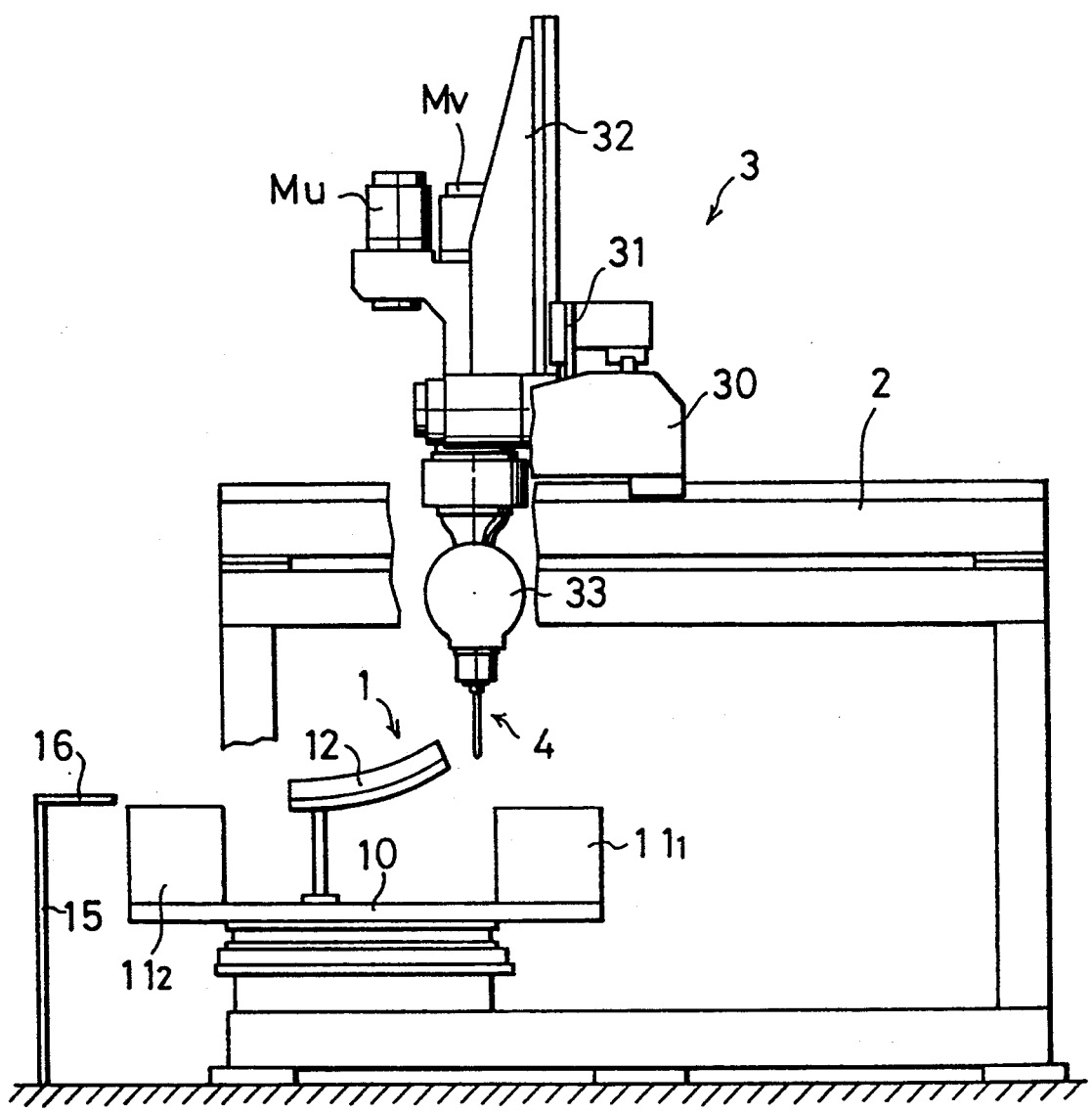
FIG. 16 is a side view of another embodying example in which the constitution of the jig unit is changed.
Figure 19A:
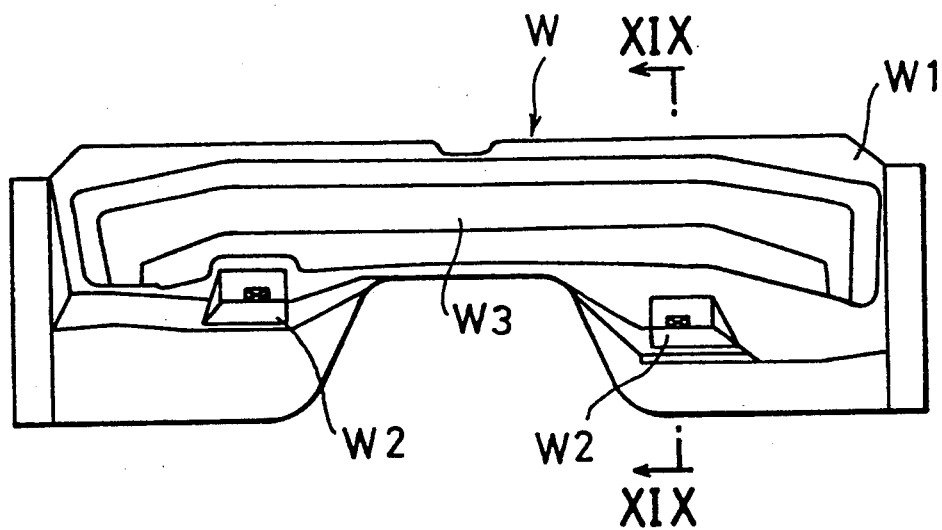
Figure 19B:
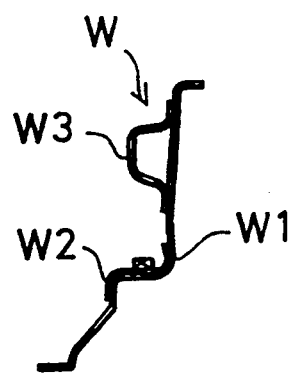

On the other hand, when assembling is made of the workpiece W which is made up of a floor-mid component of an automobile body as shown in FIG. 19A and FIG. 19B, it is necessary to assemble a semi-product W' by welding a second workpiece W2, which is a mounting member for mounting thereon a fuel tank, to a first workpiece W1, which serves as a base plate, and then weld a third workpiece W3, which is a channel-like reinforcing member, to this semi-product W'. When the assembling of this kind of product W is made by the above-described stud welding apparatus, the following procedures are followed. Namely, as shown in FIG. 16, there are mounted on the turn table 10 of the jig unit 1 the first welding jig $11_1$ for the first welding step in which the second workpiece W2 is welded to the first workpiece W1 to thereby assemble the semi-product W', and the second welding jig $11_2$ for the second welding step in which the third workpiece W3 is welded to the semi-product W' to thereby assemble a product W. When the first welding jig $11_1$ is reversed or rotated back to the welding position, the first welding step is carried out and, when the second welding jig $11_2$ is reversed to the welding position, the second welding step is carried out.

Figure 17:
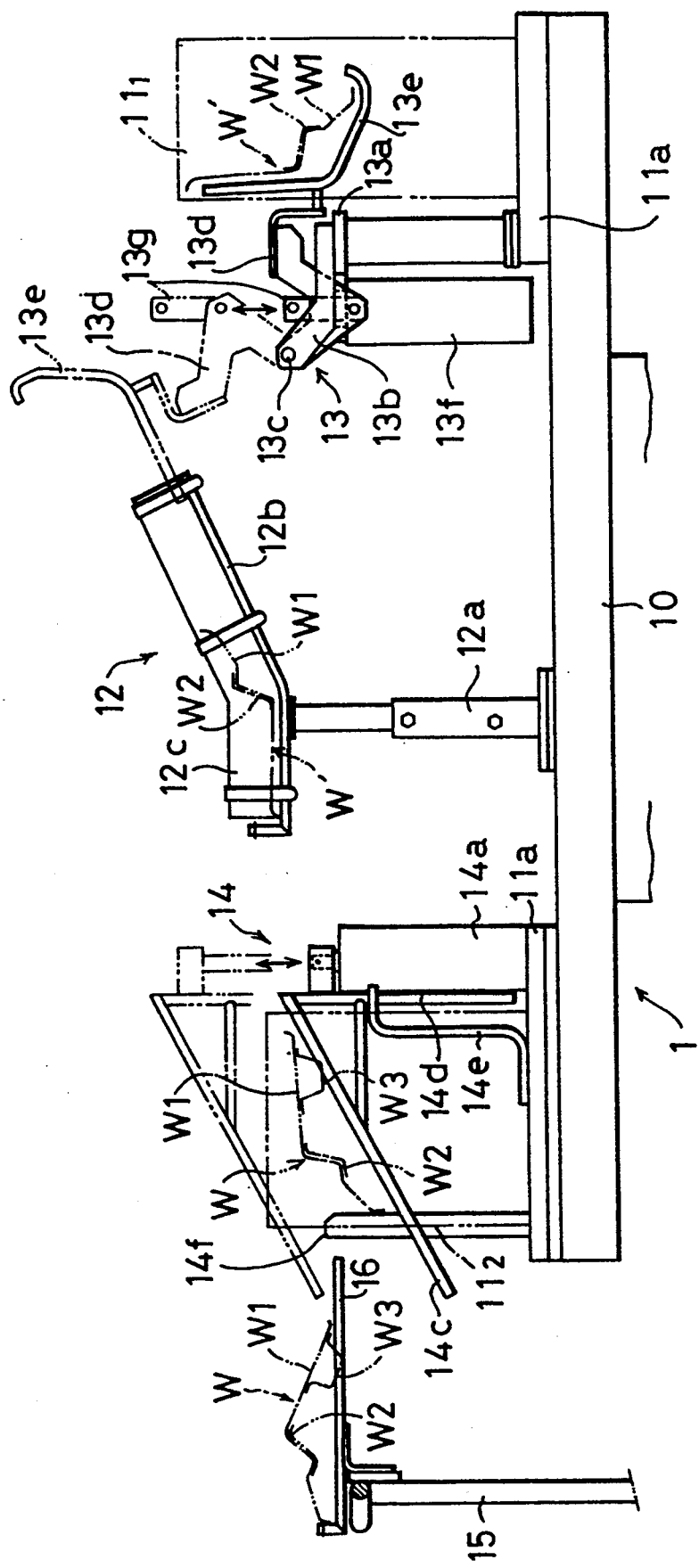
FIG. 17 is an enlarged view of the jig unit thereof.

In this case, there are provided on the turn table 10 the following, as shown in FIGS. 17 and 18, i.e., those tentative supporting members 12 for the semi-product W' which are positioned in an intermediate position between the welding jigs $11_1$, $11_2$, a transfer means 13 which is positioned on the side of the first welding jig $11_1$ and is for transferring the semi-product W' on the first welding jig $11_1$ to the tentative supporting members 12, and a discharging means 14 which is positioned on the side of the second welding jig $11_2$ and is for discharging the workpiece W on the second welding jig $11_2$.

The tentative supporting members 12 are provided both on the right side and the left side so as to support both end portions of the semi-product W'. On an upper end of each of supporting columns 12a which are vertically provided on the turn table 10, there is mounted a supporting lever 12b which extends longitudinally in the back and forth direction and is inclined upwards towards the first welding jig $11_1$, as well as a guide plate 12c on an external side of the supporting lever 12b to prevent the lateral movement of the semi-product W'.

The transfer means 13 is provided with a swing arm 13d which is swingably supported, via a swing axis 13c, on stationary arms 13b on both ends of a bracket 13a which is provided on an internal side of the jig base 11a of the first welding jig $11_1$. There is mounted on the swing arm 13d a scooping frame 13e which scoops the semi-product W' on the first welding jig $11_1$ and is approximately in L-shape as seen from one side thereof. A piston rod 13g of a cylinder 13f which is provided vertically downwardly on the bracket 13a is connected to the swing arm 13d via a link 13g. When the piston rod 13g is moved upwards, the scooping frame 13e scoops the semi-product W' on the first welding jig 11₁ and swings it towards the tentative supporting members 12 so that the semi-product W' can slide down out of the scooping frame 13e onto the tentative supporting member 12.

The discharging means 14 is provided with lifting bars 14c which are provided on both sides of a lifting frame 14b so as to be movable up and down by a cylinder 14a which is vertically provided on the inner side of the jig base 11a. The lifting bars 14c are inclined downwards towards the second welding jig 11₂. On a safety fence 15 which is provided in the setting position, there are mounted a pair of right and left supporting bars 16 for receiving thereon the product W. When the lifting bars 14c are moved upwards, the product W on the second welding jig 11₂ is lifted and the product W is slid down onto the supporting bars 16 through the inclination of the lifting bars 14c. The lifting bars 14c are supported by inserting vertical rods 14d provided at the base portion thereof into guide brackets 14e on the jig base 11a. On an outside portion of the jig base 11a there are vertically provided guide posts 14f which extend slightly above the height at which the supporting bars 16 are disposed. These guide posts 14f prevent the product W from being slid down out of the lifting bars 14c before the product W reaches the position in which the supporting bars 16 are disposed. They also push the product W right upwards so as not to cause gouging between the workpiece W and an unillustrated positioning pin which is provided on the second welding jig 11₂.

An explanation will now be made about the assembling procedure by the above-described apparatus.

First, in a condition in which the first welding jig 11₁ is returned to the setting position, the first and the second workpieces W1, W2 are set on the first welding jig 11₁. Then, the turn table 10 is rotated by half a revolution to reverse the first welding jig 11₁ in the welding position and the second welding jig 11₂ in the setting position. Thereafter, a first welding step by the robot 3 is carried out in the welding position to thereby assemble the semi-product W'. After the first welding step has been finished, the semi-product W' on the first welding jig 11₁ is transferred by the transfer means 13 to the tentative supporting members 12.

By the way, workpiece setting work to the second welding jig 11₂ is not performed at the beginning. Instead, after the transfer of the semi-product W' has been finished, the turn table 10 is rotated again by half a revolution to thereby reverse the positions of the first welding jig 11₁ to the setting position and the second welding jig 11₂ to the welding position. Then, after having set the first and the second workpieces W1, W2 onto the first welding jig 11₁ in the setting position, the first welding jig 11₁ is reversed to the welding position and the second welding jig 11₂ to the setting position.

Then, this time while the first welding step in the welding position is being carried out, the third workpiece W3 is set in the setting position to the second welding jig 11₂ and also the semi-product W' is picked up from the tentative supporting members 12 to set it to the second welding jig 11₂. Then, after the semi-product W' on the first welding jig 11₁ has been transferred by the transfer means 13 to the tentative supporting members 12, the first welding jig 11₁ is reversed to the setting position and the second welding jig 11₂ to the welding position. In the welding position the second welding step is carried out by the robot 3 to thereby assemble the product W and, also while the second welding step is being carried out, the first and the second workpieces W1, W2 are set to the first setting jig 11₁ in the setting position.

After the second welding step has been finished, the first welding jig 11₁ is reversed to the welding position and the second welding jig 11₂ to the setting position. However, since this time there exists the product W on the second welding jig 11₂, the product W is first discharged by the discharging means 14 to the supporting bars 16. While the first welding step is being carried out in the welding position, the third workpiece W3 and the semi-product W' on the tentative supporting members 12 are set to the second welding jig 11₂. Thereafter, the semi-product W' on the first welding jig 11₁ is transferred to the tentative supporting members 12 and also the product W on the supporting bar 16 is transported to an unillustrated cart or a conveyor.

By repeating the above-described works, the first welding step and the second welding step are alternately repeated in a continuous manner.

By the way, in the above embodying example, an arrangement is made such that the semi-product W' is transferred to the tentative supporting members 12 while the first welding jig 11₁ is in the welding position. However, where the setting work to the first welding jig 11₁ can be finished in a shorter time than the working time of the second welding step, it is preferable to seek for an improved working efficiency by transferring the semi-product W' to the tentative supporting members 12 after the first welding jig 11₁ has been returned to the setting position.

It is readily apparent that the above stud welding apparatus meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A stud welding apparatus having:
    a welding jig which has a plurality of back electrodes to abut a plurality of welding spots on a workpiece and on which the workpiece can be set;
    a pair of guide frames which are elongated in an X-axis direction and are set apart from each other in a Y-axis direction above a position in which said welding jig is disposed, said X-axis and said Y-axis being of two horizontal directions;
    a cartesian coordinate type robot comprising a travelling frame which is supported in a bridging manner on both said guide frames and is movable in said X-axis direction, a robot main body which is supported on said travelling frame and is movable in said Y-axis direction, and a vertically elongated elevating arm which is supported on said robot main body off towards one side in the X-axis direction relative to said travelling frame and is movable up and down; and
    a stud welding gun which is mounted on a wrist portion at a lower end of said elevating arm;
    said stud welding apparatus comprising:
    power supply passages which are provided on said travelling frame, said robot main body and said elevating arm, respectively, such that electric power can be supplied from a welding power source to said stud welding gun via these power supply passages;

said power supply passage provided on said travelling frame being constituted by a first power supply bar which is fixed to said travelling frame and is elongated in said Y-axis direction;

a pressure type first power supply joint which is provided on said robot main body and urges a contact member to be connected to said power supply passage provided on said robot main body into, and out of, contact with said first power supply bar by means of a cylinder;

said power supply passage provided on said elevating arm being constituted by a second power supply bar which is fixed to said elevating arm and is elongated in a vertical direction; and a pressure type second power supply joint which is provided on said robot main body and urges a contact member to be connected to said power supply passage provided on said robot main body into, and out of, contact with said second power supply bar by means of a cylinder.

2. A stud welding apparatus according to claim 1, wherein each of said contact members is connected to a piston rod of each of said cylinders so as to be tiltable in any direction.

3. A stud welding apparatus according to claim 1, wherein said first power supply bar is connected to said welding power supply source via a cable.

4. A stud welding apparatus according to claim 1, wherein a direction of urging said contact member of said first power supply joint is set such that an angular moment that is opposite to an angular moment about said Y-axis which is operated on said robot main body due to weight of said elevating arm, operates on said robot main body through a pressure reaction force of said contact member against said first power supply bar.

5. A stud welding apparatus according to claim 1, wherein said wrist portion comprises a wrist main body which is supported on a lower end of said elevating arm so as to be rotatable about a vertical axis, and a tool holder which is supported on said wrist main body so as to be rotatable about a horizontal axis, said stud welding gun being mounted on said tool holder, wherein electric power is supplied from said second power supply bar to said stud welding gun via a power supply passage provided on said wrist main body and a power supply passage provided on said tool holder, said stud welding apparatus further comprising:

a pressure type third power supply joint which is provided around said wrist main body and urges a contact member to be connected to said second power supply bar into, and out of, contact with said power supply passage provided on said wrist main body by means of a cylinder; and a pressure type fourth power supply joint which is provided on an axis of rotation of said tool holder and urges a contact member to be connected to one of said power supply passage provided on said wrist main body and said power supply passage provided on said tool holder into, and out of, contact with the other of said power supply passages by means of a cylinder.

6. A stud welding apparatus according to claim 5, further comprising an electrically conductive ring which is fitted on an outer periphery of said wrist main body and constitutes said power supply passage provided on said wrist main body;

wherein said contact member of said third power supply joint is provided in a pair such that they strongly contact said electrically conductive ring from diametrically opposite directions;

wherein a cylinder of said third power supply joint is mounted in a pair on said elevating arm in diametrically opposite positions of said electrically conductive ring such that each of said contact members is connected to a piston rod of each of said cylinders;

wherein a pair of tap members to be connected to said second power supply bar are provided on said elevating arm in diametrically opposite positions that are at right angels to said diametrically opposite positions of said electrically conductive ring; and wherein both end portions of each of said contact members are connected to both said tap members via a pair of flexible electrically conductive members.

7. A stud welding apparatus according to claim 6, wherein each of said contact members is connected to a piston rod of each of said cylinders so as to be tiltable in any direction.

8. A stud welding apparatus according to claim 5, wherein a cylinder of said fourth power supply joint is mounted on one of said wrist main body and said tool holder in a position on an axis of rotation of said tool holder;

wherein an electrically conductive annular plate which constitutes the power supply passage to be provided on one of said wrist main body and said tool holder is fixed to a front cover of said cylinder;

wherein said contact member of said fourth power supply joint to be connected to the power supply passage provided on the other of said wrist main body and said tool holder is disposed opposite to the direction of axis of rotation relative to said electrically conductive annular plate; and wherein said contact member is rotatably connected to that piston rod of said cylinder which projects out of said front cover.

9. A stud welding apparatus according to claim 8, wherein said contact member is connected to said piston rod of said cylinder so as to be tiltable in any direction.

10. A stud welding apparatus according to claim 1, further comprising:

a bracket which extends to one side in the X-axis direction and is fixed to each end of said travelling frame;

a first linear guide which is disposed on said bracket closer to said travelling frame;

a second liner guide which is disposed on said bracket off said first linear guide to one side in the X-axis direction;

a guide rail on each of said guide frames so as to slidably support said travelling frame via said linear guides;

pinions which engage with racks fixed to said guide frames and an electric motor for driving said pinions, said pinion and said electric motor being connected so that said travelling frame can be self-propelled in said X-axis direction, said pinions being disposed in substantially the same position in said X-axis direction as said first linear guide.

11. A stud welding apparatus according to claim 1 or claim 10, wherein said travelling frame is constituted by a pair of beam members which are parallelly provided at a distance in the vertical direction so as to support said robot main body on both said beam members; and
   wherein a first driving source for driving said travelling frame and a second driving source for driving said robot main body or said elevating arm are disposed between both said beam members.

12. A stud welding apparatus according to claim 1, wherein said stud welding gun comprises a pressing cylinder and an electrode which is mounted, via an electrode holder, on a piston rod which projects beyond a front cover of said pressing cylinder;
   wherein said piston rod is arranged to be eccentric to a piston inside said pressing cylinder;
   said welding gun further comprising a guide rod which is smaller in diameter than said piston rod and extends rearwards of said piston through a rear cover on the rear end of said cylinder; and
   a boss portion which is provided inside said rear cover so as to be fitted on an outside of said guide rod.

13. A stud welding apparatus according to claim 12, further comprising means for detecting an electric current to flow in each of said back electrodes and means for controlling a welding electric current depending on a detected value of said electric current detecting means.

14. A stud welding apparatus according to claim 1, wherein said plurality of back electrodes of said welding jig are classed into a plurality of groups so as to prevent back electrodes lying close to each other from belonging to the same group as much as possible, wherein power supply route is provided in a plurality of numbers depending on the grouping of said back electrodes, and wherein means is provided for selectively connecting said power supply routes to said welding power supply source.

15. A stud welding apparatus according to claim 1, said stud welding apparatus being adapted to perform a first welding step for assembling a semi-product by assembling a plurality of workpieces, and a second welding step for assembling a product by welding other workpieces to the semi-product, wherein:
   said welding jig comprises a first welding jig on which a plurality of workpieces constituting a semi-product can be set and a second welding jig on which a semi-product and the other workpieces can be set;
   said stud welding apparatus further comprising:
   a turn table for mounting thereon both said welding jigs such that both said welding Jigs can be alternately reversed between a welding position within a range of movement of said cartesian coordinate type robot and a workpiece setting position outside said range of movement;
   a tentative supporting member which is provided on said turn table for tentatively supporting a semi-product and is positioned in an intermediate position between both said welding jigs; and
   transfer means which is provided on said turn table for transferring a semi-product on said first welding jig to said tentative supporting member and is positioned on the side of said first welding jig.

16. A stud welding apparatus according to claim 15, further comprising discharging means which is provided on said turn table for discharging a product on said second welding jig and is positioned on the side of said second welding jig.

* * * * *